United States Patent
Uneyama et al.

(10) Patent No.: US 6,941,434 B2
(45) Date of Patent: Sep. 6, 2005

(54) SELF-SYNCHRONOUS FIFO MEMORY DEVICE HAVING HIGH ACCESS EFFICIENCY, AND SYSTEM PROVIDED WITH INTERFACE FOR DATA TRANSFER USING THE SAME

(75) Inventors: Takuji Uneyama, Yamatokoriyama (JP); Manabu Onozaki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 315 days.

(21) Appl. No.: 10/376,639

(22) Filed: Mar. 3, 2003

(65) Prior Publication Data

US 2003/0172242 A1 Sep. 11, 2003

(30) Foreign Application Priority Data

Mar. 7, 2002 (JP) .................................... 2002-062107

(51) Int. Cl.[7] .......................... G06F 12/00; G06F 13/00
(52) U.S. Cl. ...................... 711/167; 711/100; 711/154; 711/169; 710/57; 710/58; 710/61
(58) Field of Search ................................ 711/100, 154, 711/167, 169; 710/57, 58, 61

(56) References Cited

U.S. PATENT DOCUMENTS 5,568,443 A * 10/1996 Dixon et al. ............ 365/230.05
5,784,377 A * 7/1998 Baydar et al. ................ 370/463
6,671,275 B1 * 12/2003 Wong et al. .................. 370/389
6,772,243 B2 * 8/2004 Jones et al. ................... 710/57
2002/0116556 A1 * 8/2002 Jones et al. ................... 710/36
2003/0095560 A1 * 5/2003 Arita et al. ................... 370/431
2004/0027909 A1 * 2/2004 Muramatsu et al. ......... 365/232
2004/0161064 A1 * 8/2004 Brethour et al. ............. 375/347

FOREIGN PATENT DOCUMENTS

| JP | 22-1666 A | 1/1990 |
| JP | 10-105375 A | 4/1998 |
| JP | 10-214174 A | 8/1998 |

\* cited by examiner

Primary Examiner—Tuan V. Thai
(74) Attorney, Agent, or Firm—Birch, Stewart, Kolasch & Birch, LLP

(57) ABSTRACT

An arbitration circuit adjusts timings of a write request signal from a first external device and a read request signal from a second external device. An RAM performs data write/data read in response to the external write request/read request. A next-state function is provided, which has a function to calculate a write address/read address to be input to the RAM in response to the external write request/read request, and a function to accurately count data stored in a FIFO.

18 Claims, 20 Drawing Sheets

FIG. 10

| CASE | INPUT SIGNAL OF STATE TRANSITION CIRCUIT | | OUTPUT SIGNAL OF STATE TRANSITION CIRCUIT | | | | | | |
|---|---|---|---|---|---|---|---|---|---|
| | W.C. | R/W | W.P. | R.P. | W.C. | ADDR[10:0] | EXB | IE | PASS |
| A | 0 | 0 | HOLD | HOLD | +1 | W.P. | 1 | 1 | 1 |
| B | 1 | 0 | HOLD | HOLD | +1 | W.P. | 1 | 1 | 1 |
| C | 2≦W.C.≦2046 | 0 | +1 | HOLD | +1 | W.P. | 0 | 1 | 0 |
| D | 2047 | 0 | +1 | HOLD | +1 | W.P. | 0 | 0 | 0 |
| E | 2048 | 0 | DATA WRITE PROHIBITED | | | | | | |
| F | 0 | 1 | HOLD | HOLD | 0 | R.P. | 0 | 1 | 0 |
| G | 1 | 1 | HOLD | HOLD | −1 | R.P. | 0 | 1 | 0 |
| H | 2 | 1 | HOLD | HOLD | −1 | R.P. | 0 | 1 | 0 |
| I | W.C.≧3 | 1 | HOLD | +1 | −1 | R.P. | 1 | 1 | 0 |

W.C. : Word Count (COUNT OF DATA STORED WITHIN ASYNCHRONOUS FIFO MEMORY DEVICE. INITIAL VALUE 0)
R/W : Read/Write (WRITE IF 0, READ IF 1)
W.P. : Write Pointer (WRITE ADDRESS TO BE INPUT TO FIFO MEMORY. INITIAL VALUE 0)
R.P. : Read Pointer (READ ADDRESS TO BE INPUT TO FIFO MEMORY. INITIAL VALUE 0)
ADDR: ADDRESS LINE TO FIFO MEMORY
EXB : DATA ERASE SIGNAL (ERASE IF 0)
IE : DATA WRITE PERMISSION SIGNAL (WRITE PROHIBITED IF 0, WRITE PERMITTED IF 1)
PASS: DATA PASS SIGNAL (PASS IF 1)
FUL : FULL STATE FLAG (RECOGNIZED AS FULL STATE IF 1. INITIAL VALUE 0)
EMP : EMPTY STATE FLAG (RECOGNIZED AS EMPTY IF 1. INITIAL VALUE 1)

| CASE | INPUT SIGNAL OF STATE TRANSITION CIRCUIT | | OUTPUT SIGNAL OF STATE TRANSITION CIRCUIT | |
|---|---|---|---|---|
| | W.C. | R/W | FUL | EMP |
| J | $\leq$TH_EMP-1 | 0 | — | 1 |
| K | >TH_EMP-1 | 0 | — | 0 |
| L | $\geq$TH_FUL-1 | 0 | 1 | — |
| M | <TH_FUL-1 | 0 | 0 | — |
| N | $\leq$TH_EMP+1 | 1 | — | 1 |
| O | >TH_EMP+1 | 1 | — | 0 |
| P | $\geq$TH_FUL+1 | 1 | 1 | — |
| Q | <TH_FUL+1 | 1 | 0 | — |

SELF-SYNCHRONOUS FIFO MEMORY DEVICE HAVING HIGH ACCESS EFFICIENCY, AND SYSTEM PROVIDED WITH INTERFACE FOR DATA TRANSFER USING THE SAME

BACKGROUND OF THE INVENTION

1. Field of the Invention

The present invention relates to a self-synchronous FIFO memory device, and a system with an interface for data transfer using the same, and more particularly, to a scheme for controlling data input/output to/from an FIFO memory device.

2. Description of the Background Art

A logic circuit performing a pipelined data processing in synchronization with a clock is usually configured as a logic circuit LSI. Such a logic circuit LSI has attained higher speed and smaller size, year after year. That is, an interconnection length is made larger, and an interval between the interconnections is made smaller. Accordingly, a series resistance in the interconnection and a parallel capacity between the interconnections become larger. Because of this, delay of a signal and waveform rounding have been more significant. An effect thereof, however, considerably varies depending on the interconnection length. Therefore, it is difficult to have a uniform interconnection length toward all flip-flops arranged on an overall chip in a random fashion, as well as to distribute an in-phase single clock.

In order to avoid the problem, for example, it is necessary to generate a clock tree in which a buffer is arranged in a multi-stage tree structure, so as to achieve equal delay on the overall chip, which will increase the cost. Therefore, a logic circuit locally synchronizing adjacent pipeline registers and having a self-synchronous pipeline that does not require the in-phase single clock, has been discussed.

In the self-synchronous pipeline, when data transfer is temporarily forced to be stopped at an output end of the pipeline, for example, due to the fact that a subsequent device is in a state in which it cannot receive output data from the pipeline, the data transfer is forcibly stopped in a chained manner toward an input end of the pipeline. Then, it will be necessary to wait at the output end of the pipeline until the data transfer is permitted again. During this process, by "squeezing" the data in the pipeline normally flowing with a certain interval, an autonomous buffering capability is attained. If the buffering capability is overcome, however, a state in which the data cannot temporarily be received at the input end of the pipeline will be caused.

In such a case, it is desirable to reinforce the buffering capability by inserting the FIFO memory device in the pipeline. In addition, if the data is transferred between two different systems having a self-synchronous pipeline configuration, and particularly if a data transfer rate is different therebetween, it is desirable to insert the FIFO memory device between the two systems, to transfer data in response to an independent write/read request, so that one system writes data in the FIFO memory device while the other system reads the data from the same, for example.

FIG. 13 shows an example of an FIFO memory device utilizing an autonomous buffering capability of the self-synchronous pipeline, as a conventional art. In FIG. 13, the FIFO memory device is configured with pipeline registers 81, 82, 83 constituting a pipeline, and self-synchronous transfer control circuits 84, 85, 86 supplying a clock to a pipeline register while establishing handshaking with one another. Hereinafter, the self-synchronous transfer control circuit is denoted as a C element, and a set of one C element and one pipeline register operating with the clock supplied by the C element is denoted as a self-synchronous data transmission path.

Next, FIG. 14 shows an example of the inside of C elements 84, 85, 86 in FIG. 13. In FIG. 14, the C element consists of: a CI signal terminal 91 receiving a transfer request signal (SEND signal) from a preceding stage; an RO signal terminal 92 returning an acknowledge signal (ACK signal) indicating reception of the transfer request from CI signal terminal 91 to the preceding stage; a CP signal terminal 93 sending a clock pulse to the pipeline register in response to the transfer request from the CI signal terminal 91; a CO signal terminal 94 transmitting the transfer request from the preceding stage to a next stage; an RI signal terminal 95 to which the acknowledge signal indicating reception by the next stage of the transfer request from a CO output terminal is returned; a flip-flop 96 holding a transfer request reception state; an NAND gate 97 synchronizing flip-flops 96, 98; and flip-flop 98 holding a transfer request state to the next stage.

FIG. 15 is a timing chart showing an operation of the C element. When an "L" level signal is input to a pulse input terminal CI, that is, when the data transfer is requested from the preceding stage, flip-flop 96 is set, and an "H" level signal is output from an output node thereof. Then, the "L" level signal is output from a transfer permission output terminal RO, and further data transfer is prohibited. Hereinafter, signal terminals 91–95 refer to a pulse input terminal CI, a transfer permission output terminal RO, pulse output terminals CP, CO, and a transfer permission input RI terminal, respectively. These terminals are also simply denoted as CI (ci), RO (ro), CP (cp), CO (co) and RI (ri) terminals respectively.

After a certain time has passed, the "H" level signal is input to pulse input terminal CI, and setting of the data from the preceding stage to the C element is completed. When this state is established, when the "H" level signal is being input from transfer permission input terminal RI (that is, data transfer is permitted from the subsequent stage), and when pulse output terminal CO outputs the "H" level signal and data is not being transferred to the subsequent stage, NAND gate 97 is activated, and outputs the "L" level signal.

As a result, flip-flop 96 is reset and flip-flop 98 is set. Accordingly, the "H" level signal is output from pulse output terminal CP to the pipeline register, and the SEND signal of "L" level is output from pulse output terminal CO to the subsequent stage. That is, data transfer is requested to the subsequent stage. The C element in the subsequent stage that has received the SEND signal of "L" level sends the ACK signal of "L" level indicating prohibition so that further data is not transferred to the C element in the preceding stage. The C element in the preceding stage receives the ACK signal of "L" level input from transfer permission input terminal RI, and accordingly, flip-flop 98 is set. Consequently, the "L" level signal is output from pulse output terminal CP to the pipeline register, and the SEND signal of "H" level is output from pulse output terminal CO to the subsequent stage. Then, data transfer is terminated.

Transfer request signal (SEND signal) is input to C element 84 in the first stage of the pipeline in FIG. 13, and process data D is input to pipeline register 81 also in the first stage. Thus, flip-flop 96 within C element 84 holding the transfer request reception state is set, and an acknowledge signal ACK is returned from C element 85. Then, CI terminal of C element 84 returns to "H" level, and NAND gate 97 within C element 84 outputs "L" level. In addition, flip-flop 98 within C element 84 holding the transfer request to the next stage is set, and flip-flop 96 is cleared.

When a clock CP to pipeline register 81 of C element 84 attains "H" level, input data D is latched in pipeline register 81 for output to a node Q. In addition, a transfer request signal to the next stage is output to the CO terminal of C element 84. The signal is input to C element 85 constituting the second stage of the pipeline in FIG. 13. When C element 85 performs an operation similar to C element 84, data Q output from pipeline register 81 is latched in pipeline register 82 in the second stage, for output to node Q. C element 86 also operates in a manner similar to C elements 84, 85. That is, data output from pipeline register 82 in the second stage is latched in pipeline register 83 in the third stage, for output to output data terminal Q.

FIG. 16 shows another example of the self-synchronous FIFO memory device (FIFO) as the conventional art. This example shows a configuration in which n self-synchronous data transmission paths (a set of the C element and the pipeline register serving as a pair of the former) in FIG. 13 are connected in series. With reference to a timing chart shown in FIG. 17, an operation in a procedure for inputting (writing) n data, and outputting (reading) the n data after the FIFO attains a full state in the circuit shown in FIG. 16 will be described.

First, a procedure for inputting n data successively from an FIFO empty state will be described. When first data DATA1 is input from a terminal D with an "L" pulse signal input 12-1 (a write clock) from CI terminal, a C element 114 establishes handshaking with a C element 115 in the subsequent stage, as described in FIG. 15, and transfers first input data DATA1 to a pipeline register 112 in the second stage. Here, a pulse signal 12-2 indicating that transfer of DATA1 to the data transmission path in the subsequent stage has been normally completed is output from terminal.

More specifically, fall from "H" level to "L" level of the RO terminal indicates reception of the input data from the preceding stage, while rise from "L" level to "H" level indicates completion of a transfer operation of the received data to the subsequent stage.

C element 115 in the data transmission path in the second stage operates in a similar manner, and DATA1 is transferred to a pipeline register in the third stage. A C element in a following stage also operates in a similar manner, and DATA1 is transferred as far as a data transmission path in the nth stage. The C element in the nth stage also performs a normal transfer operation. That is, DATA1 is latched in a pipeline register 113 in the nth stage, an "L" level signal 12-3 is output from CO terminal, and DATA1 is output from data output terminal Q.

Further, a state in which CO terminal outputs the "L" signal indicates that data to be read is present (a read data ready state). In such a state, when an "L" level pulse signal (read clock) is input from RI terminal, CO terminal rises to "H" level, and an operation for reading DATA1 is completed. Here, however, the input signal of RI terminal is fixed to "H" level. That is, a state in which one data (DATA1) is stored within the FIFO is maintained.

Next, when second data DATA2 is input from terminal D with a pulse signal input 12-6 (write clock) at "L" level from CI terminal, DATA2 is transferred to the pipeline register in the subsequent stage, in a manner similar to DATA1. Here, however, DATA 1 has been stored in pipeline register 113 in the last stage, the "L" level signal is output from an ro terminal of a C element 116 in the last stage, and further data transfer is prohibited. Therefore, a state is maintained, in which input DATA2 is stored in the pipeline register in the (n−1)th stage, which is a stage last but one.

Similarly, while the input from RI terminal is held at "H" level, the data is successively input. When nth data DATAn is input from terminal D with a write clock 12-8 from CI terminal, DATAn is stored in a pipeline register 111 in the first stage. On the other hand, since DATA(n−1) has been stored in pipeline register 112 in the second stage (that is, the "L" level signal indicating data transfer prohibition is output from ro terminal of C element 115 in the second stage), further data transfer is not performed. Similarly, since the data has been stored in the pipeline register 111 in the first stage, further input data is not accepted. In other words, the "L" level signal indicating data transfer prohibition is output from ro terminal of C element 114 in the first stage as well as from RO terminal connected to that ro terminal. This state is referred to as a "FIFO full state."

Next, a procedure for reading n data from the FIFO full state will be described. When a pulse signal input 12-10 (read clock) at "L" level from RI terminal is input, a C element 116 in the last stage outputs an "H" level signal 12-11 indicating termination of the data transfer operation for DATA1 from co terminal, and the "H" level signal permitting data transfer is output from ro terminal to the C element in the preceding stage. The C element in the (n−1)th stage receives the "H" level signal indicating data transfer permission from ri terminal, and transfers DATA2 to pipeline register 113 in the nth stage. Then, a read data ready state (12-13) is established.

Similarly, data from DATA3 to DATAn are transferred on one-by-one basis to the pipeline registers in the subsequent stages. As a result, pipeline register 111 in the first stage attains the empty state, and the "H" level signal (12-12) indicating that there is an empty space available in the FIFO is output from RO terminal.

Further, by inputting (n−1) read clocks from RI terminal, data from DATA2 to DATAn can be read (12-14). Here, when nth data DATAn is read, CO terminal outputs the "H" level signal. At this time point, however, the FIFO attains a completely empty state. Therefore, "H" continues to be output from CO terminal (12-15).

Thus, the circuit in FIG. 16 can easily be inserted between two external devices into which the write clock on the one hand and the read clock on the other hand are independently input in an asynchronous manner. This is because CO terminal serves as an empty flag confirming that the FIFO is in an empty state, while RO terminal serves as a full flag confirming that the FIFO is in a full state.

A role of the self-synchronous FIFO device is to smoothly transferring data between systems operating with two different clocks. The self-synchronous FIFO device introduced in conjunction with the conventional art sufficiently attains this role, because it can perform read/write to/from the FIFO independently.

Here, consider an example in which the conventional self-synchronous FIFO device is used as an interface between an asynchronous data driven information processor and a general-purpose system. In such a case, it would be more efficient, if a self-synchronous FIFO device 41 can store data of large capacity when self-synchronous FIFO device 41 performs DMA transfer of the data from an asynchronous data driven information processor 30 as shown in FIG. 18, for example, via a bus to a memory 42 by using a DMA controller 43. In order for the self-synchronous FIFO device according to the conventional art to store the data of large capacity, the data transmission paths are connected in series for storing a maximum count of data, which will lead to a larger circuit size. In addition, delay in signal propagation of the empty flag (CO terminal shown in FIG. 16)/full flag (RO terminal shown in FIG. 16) controlling a data empty state/full state within the FIFO will be more significant, and an idle time in the overall system will increase.

For example, consider an example in which the self-synchronous FIFO memory device according to the conventional art is adopted as self-synchronous FIFO memory device 41 in the system shown in FIG. 18. FIG. 18 shows an example in which self-synchronous FIFO memory device 41 is used to interface asynchronous data driven information processor 30 with a bus of CPU. In this system, the data processed in asynchronous data driven information processor 30 is accumulated in self-synchronous FIFO memory device 41. When the FIFO attains a data full state, the accumulated data is collectively subjected to DMA transfer by DMA controller 43 from self-synchronous FIFO memory device 41 to memory 42. An input controller 31 determines to which nPE the data input from the bus to asynchronous data driven information processor 30 is to be transferred. A router 32 transfers the data to a destination nPE that has been determined.

A data processing unit is represented by nPE1, nPE2, . . . , nPEn. Transferred data is processed at nPE, and transferred to an output controller 33 via router 32. Output controller 33 determines whether to transfer the data again to nPE via input controller 31 or to output the data to self-synchronous FIFO memory device 41. Self-synchronous FIFO memory device 41 accumulates the data input from asynchronous data driven information processor 30. When self-synchronous FIFO memory device 41 attains the data full state (the RO terminal shown in FIG. 16 is set to "L" level), the read clocks are collectively input from DMA controller 43 to self-synchronous FIFO memory device 41 (the "L" pulse signals are collectively input from the RI terminal shown in FIG. 16). Thus, DMA transfer is performed.

On the other hand, from an instant when the FIFO attains the full state (the RO terminal shown in FIG. 16 is set to "L" level) until the time point when the first data is read (the "L" level pulse signal is input from the RI terminal shown in FIG. 16) and a write prohibition state is reset (the RO terminal shown in FIG. 16 rises to "H" level), data write (data transfer from the output controller to self-synchronous FIFO memory device 41) cannot be carried out, even if it is desired. Since a time period from when the read clock (the "L" level pulse signal from the RI terminal) is input until when the RO terminal rises to "H" level is long (that is, propagation delay of the RO terminal is large), the write prohibition time will be extended, and a time period regarded as waste in the system is produced.

In order to reduce the idle time in the system, it is desirable to allow the FIFO device to output the full flag indicating a logically full state separately, so that burst read, that is, reading data collectively, can be carried out before the FIFO attains a completely, physically full state (here, a "physically full state" represents a state in which the data of the maximum count that the FIFO can store has been stored, while a "logically full state" represents a state in which the FIFO has stored the data of the count that a user externally designated to the FIFO). In doing so, the full flag can be output while writing is not prohibited, and data write/read to/from the FIFO can be carried out in parallel. Thus, the idle time of the system can be reduced.

As another example, consider an example in which the self-synchronous FIFO memory device according to the conventional art is adopted as the self-synchronous FIFO memory device in the system shown in FIG. 19. FIG. 19 shows an example in which a self-synchronous FIFO memory device 54 aiming at efficient data transfer is used to connect a media processor 50 consisting of a CPU 51, a memory 52, and an input/output interface 53 with a PCI bus. In this system, the data processed in CPU 51 and stored in memory 52 is subjected to burst write into self-synchronous FIFO memory device 54. When the FIFO attains the data full state, the accumulated data is subjected to burst read collectively from self-synchronous FIFO memory device 54 to a memory 56 by a DMA controller 57.

The data input from the PCI bus via input/output interface 53 to media processor 50 is processed by CPU 51, and a process result is stored in memory 52. When the empty state (the CO terminal shown in FIG. 16 is set to "H" level) in which no data is stored in self-synchronous FIFO memory device 54 is attained, the data stored in memory 52 by CPU 51 is subjected to burst transfer, and written in the FIFO by CPU 51 (the CO terminal shown in FIG. 16 is set to "L"). As a result of several times of burst write, the FIFO attains the data full state (the RO terminal shown in FIG. 16 is set to "L" level). DMA controller 57 receives this, and burst read from the FIFO to memory 56 is started (the RO terminal shown in FIG. 16 is set to "H" level).

When the FIFO attains the data empty state as a result of several times of burst read, burst write from memory 52 to the FIFO is performed again. In the system in which both burst write and burst read are performed with respect to the FIFO, reading cannot be performed during burst write, and writing cannot be performed during burst read. Therefore, the idle time in the system is produced.

In order to reduce the idle time in the system, the FIFO is provided with a full flag threshold value for recognizing the full state (logically full state) the user designated to the FIFO before the FIFO attains the completely full state as shown in the example of FIG. 18, as well as an empty threshold value for recognizing the empty state (logically empty state) the user designated to the FIFO before the FIFO attains the completely empty state (physically empty state in which no data is stored in the FIFO). If this is achieved, data transfer efficiency will be enhanced.

In the example of FIG. 19, an application is possible, in which two types of threshold values, that is the full flag threshold value and the empty flag threshold value, are provided to the FIFO, to perform burst write until the data count in the FIFO exceeds the full flag threshold value, and to perform burst read until the data count in the FIFO becomes smaller than the empty flag threshold value. In other words, in a state in which the data count in the FIFO is larger than the empty flag threshold value and smaller than the full flag threshold value, burst write and burst read can be carried out in parallel. Thus, efficient data transfer can be achieved, and the idle time in the system can be reduced. In addition, by customizing the full flag threshold value and the empty flag threshold value, the application can be adapted to a system having the different units for burst write and burst read respectively.

In the conventional FIFO memory device, however, there is no means for knowing an accurate count of data stored in the FIFO. Therefore, it is difficult to precisely control burst write/burst read.

FIG. 20 is a block diagram showing an asynchronous FIFO circuit disclosed in Japanese Patent Laying-Open No. 10-105375 as an analogous technique in the conventional art. The asynchronous FIFO circuit shown in FIG. 20 is an FIFO circuit inputting/outputting data in an asynchronous manner to/from the external device. In this circuit, when a prescribed count of data is written from a write control circuit 63 to a first FIFO 61, the count of the written data is stored in a second FIFO 62. Then, when the data is collectively read from first FIFO 61 by a read control circuit 64 based on information on the written data count within a counter 65 by that data count, the count of the read data is stored in second FIFO 62. Then, based on information on the read data count, the data is collectively written into first FIFO 61 by that data count from a write side.

The asynchronous FIFO circuit shown in FIG. 20 stores in second FIFO 62, only either information of the count of the data collectively written or the count of the data collectively read. Therefore, it is necessary to distinguish between a circuit for performing burst write and a circuit for performing burst read in FIFO 62, when performing burst write or burst read. In addition, burst write and burst read cannot be carried out in parallel. Further, when the FIFO memory is expanded so as to store data of a large capacity, the circuit size will be large.

FIG. 21 shows an asynchronous FIFO circuit disclosed in Japanese Patent Laying-Open No. 10-214174. This asynchronous FIFO circuit aims to obviate the need for synchronizing a write signal and a read signal in determining the full state/empty state so as to implement faster writing/reading, and aims to eliminate a possibility of misrecognizing the full state/empty state by removing decode processing.

This circuit is also an FIFO circuit inputting/outputting data in an asynchronous manner to/from the external device, and provided with the full flag/empty flag. A register file 71 receives input of the data of a plurality of bits from the outside, and stores the data via a write control signal. In addition, register file 71 selects the stored data of a plurality of bits via a read control signal, and outputs the data as the read data of a plurality of bits in response to an external read signal.

A write pointer 72 generates a write address signal in synchronization with an external write signal WR, and a write circuit 73 writes the data into register file 71 in response to the write address signal and the external write signal WR. A read pointer 74 generates a read address signal in synchronization with an external read signal RD, and a read circuit 75 reads the data from register file 71 in response to the read address signal.

A full/empty identification circuit 76 receives an inverted signal of external write signal WR and an inverted signal of the read signal RD, and generates and outputs a flag indicating full or empty of a shift register block contained inside.

The full flag/empty flag, however, indicates a physically full state/empty state. Therefore, the idle time in the system as shown in the examples of FIGS. 18 and 19 may be produced. In addition, in expanding so as to store the data of large capacity, the circuit size tends to be large as in the circuit shown in FIG. 16, and delay of a signal of full/empty will be significant. Accordingly, it is difficult to process in parallel asynchronous requests for read and write while assuring a normal operation. Because of these constraints, in the system requiring a FIFO memory device with a large capacity and capable of precise control of data input/output, it is difficult to insert the above-described asynchronous FIFO memory device between two devices.

SUMMARY OF THE INVENTION

A primary object of the present invention is to provide a self-synchronous FIFO memory device with high access efficiency, which is a FIFO buffer device with a large capacity that can easily be inserted between two external devices, and which keeps track of an accurate data count within a self-synchronous FIFO memory device to assure reliable, successive access.

An FIFO memory device according to the present invention is a first-in first-out memory device having at least one self-synchronous transfer control circuit. The FIFO memory device includes an arbitration circuit adjusting timings of a write request signal from a first external device and a read request signal from a second external device; a memory cell array unit performing data write/data read in response to the external write request/read request; and a state control circuit having a function to calculate a write address/read address to be input to the memory cell array unit in response to the external write request/read request, and a function to accurately count data stored in an FIFO.

In addition, the self-synchronous transfer control circuit constitutes a data transmission path together with a register circuit or the memory cell array unit. Each data transmission path constitutes a pipeline via the self-synchronous transfer control circuit.

As described above, according to the present invention, a storage of data of large capacity is constituted with a prescribed number of stages of pipeline. Therefore, propagation delay of a read data present flag RDY and a write data permission flag RO signal can be made smaller. Consequently, an accurate read/write operation can be achieved with respect to a read/write request independently input in an asynchronous manner. Particularly, even in such a critical state that RDY or RO signal varies, for example, a state in which the self-synchronous FIFO memory device goes out of an empty state, or a state in which the self-synchronous FIFO memory device goes out of a full state, a normal operation can be assured.

In addition, the circuit size can be reduced to less than half the conventional self-synchronous FIFO circuit.

In a preceding stage of the data transmission path including the memory cell array, at least two data transmission paths including the register circuit via the arbitration circuit are provided. One of the data transmission paths has the write request signal input, while the other has the read request signal input.

A subsequent stage of the data transmission path including the memory cell array is pipeline-connected with a data transmission path including further at least one register circuit. A pipeline is configured so as to transmit data toward a data transmission path in the subsequent stage, so long as data is present within the FIFO.

The self-synchronous FIFO memory device according to the present invention is configured with a technique for a data transfer circuit of a self-synchronous handshaking scheme. Therefore, the self-synchronous FIFO memory device not only maintains an advantage that it does not operate when the data to be processed is not input (that is, power is not wasted), which is a characteristic of the self-synchronous handshaking scheme, but also can solve the above-described problem.

In addition, the state control circuit counts, and holds the count of, the data present within the FIFO by monitoring the read request signal or the write request signal, and outputs a data full signal and a data empty signal from the data count and a predetermined full state data count threshold value and empty state threshold value.

Further, the self-synchronous FIFO memory device according to the present invention accurately counts the data within the FIFO device with a Word Count (W.C.) register, and can determine full/empty using externally input full flag threshold value (TH_FUL)/empty flag threshold value (TH_EMP). Utilizing the full flag (FUL)/empty flag (EMP) output through this determination, burst write/burst read of the data can be processed in parallel.

In a system having a self-synchronous FIFO memory device according to the present invention inserted in a data path between first and second external devices each operating with a different timing signal, one external device successively issues a write request to the self-synchronous FIFO memory device, so long as a data full signal is inactive, and the other external device successively issues a read request to the self-synchronous FIFO memory device, so long as a data empty signal is inactive.

The self-synchronous FIFO memory device according to the present invention is used as a queue buffer between pipelines constituting a processor circuit.

The self-synchronous FIFO memory device according to the present invention can easily be inserted as an interface among a variety of systems, and can store data of large capacity, with the circuit size relatively small. In addition, the self-synchronous FIFO memory device can keep track of an accurate count of the data within the self-synchronous FIFO memory device to assure reliable successive access. Thus, a self-synchronous FIFO memory device with high access efficiency can be implemented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 10 and 11 are state transition charts showing an operation of a next-state function in FIG. 1.

FIG. 12 is a block diagram showing an application of the self-synchronous FIFO memory device according to the present invention.

DESCRIPTION OF THE PREFERRED EMBODIMENTS

In the following, one embodiment of the present invention will be described in detail with reference to the figures.

Figure 2:
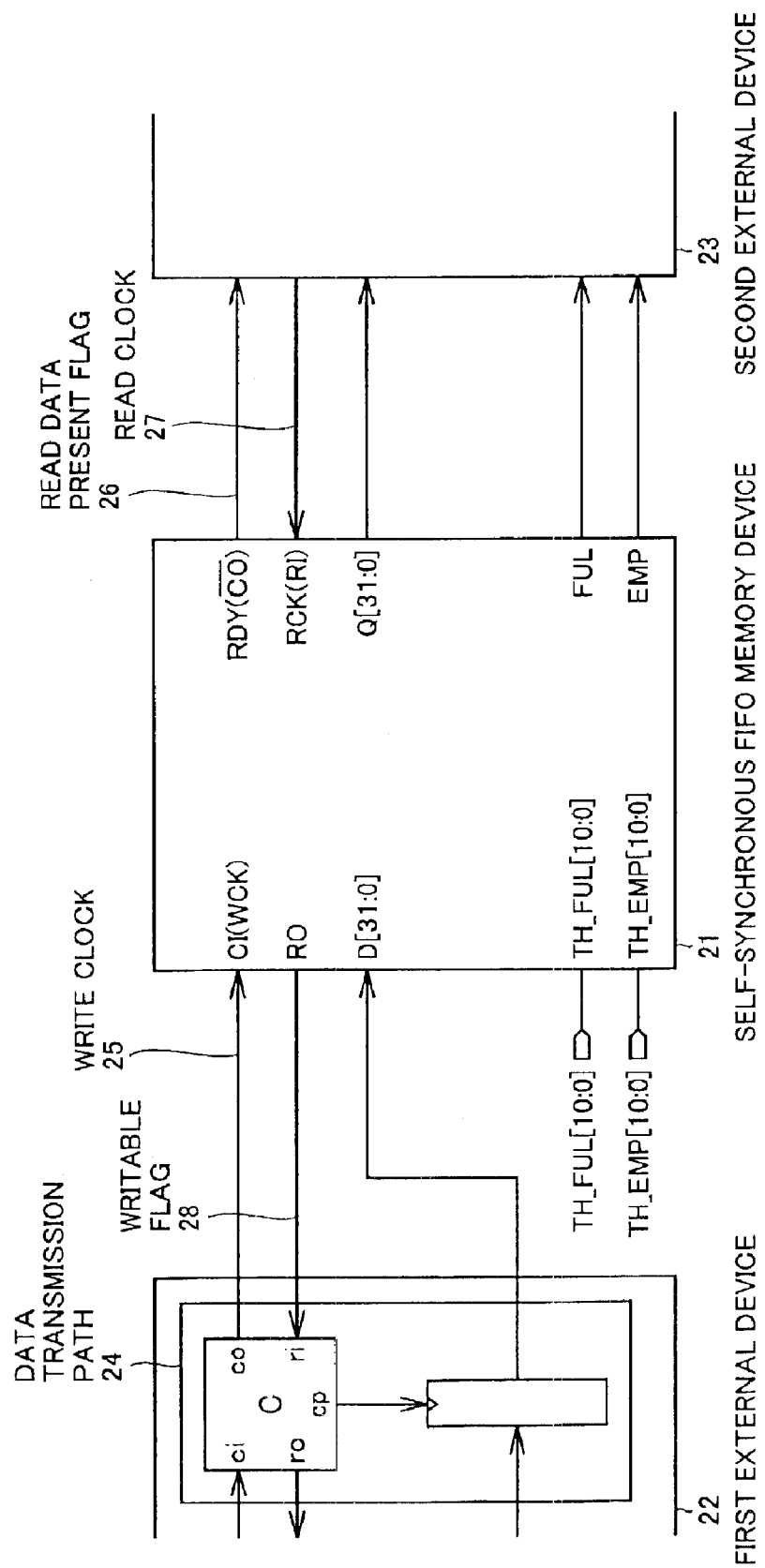
FIG. 2 is a block diagram of a system including the self-synchronous FIFO memory device in FIG. 1.

In FIG. 2, a self-synchronous FIFO memory device 21 according to one embodiment of the present invention is inserted between a first external device 22 and a second external device 23, and serves to transfer data from first external device 22 to second external device 23. External device 22 has a data transmission path 24 consisting of the C element and the pipeline register in the last stage, and performs voluntary data transfer to self-synchronous FIFO memory device 21. In other words, if a state, in which data transmission path 24 in the last stage holds the data, a writable flag 28 attains "H" level, and there is a space available for storing data in self-synchronous FIFO memory device 21, is established, external device 22 automatically inputs a write clock 25 to self-synchronous FIFO memory device 21, and transfers data D to self-synchronous FIFO memory device 21.

External device 23 receives read data Q by an input of a read clock 27, if a read data present flag 26 from self-synchronous FIFO memory device 21 attains "H" level. Self-synchronous FIFO memory device 21 not only transfers data received from external device 22 to external device 23, but also outputs a full flag FUL and an empty flag EMP to external device 23, based on a full flag threshold value TH_FUL, an empty flag threshold value TH_EMP set from the outside, and the count of the data stored in the FIFO memory device. In other words, if the count of the data stored in the FIFO memory device exceeds full flag threshold value TH_FUL, "H" level is output from full flag FUL. In contrast, if the count of the data stored in the FIFO memory device is smaller than empty flag threshold value TH_EMP, "H" level is output from empty flag EMP.

External device 22 does not have to be a device performing voluntary data transfer as described above, and it may be a device actively inputting the write clock. In addition, external device 23 does not necessarily have to a device actively inputting the read dock, and may be a device voluntarily performing data transfer.

Figure 1:
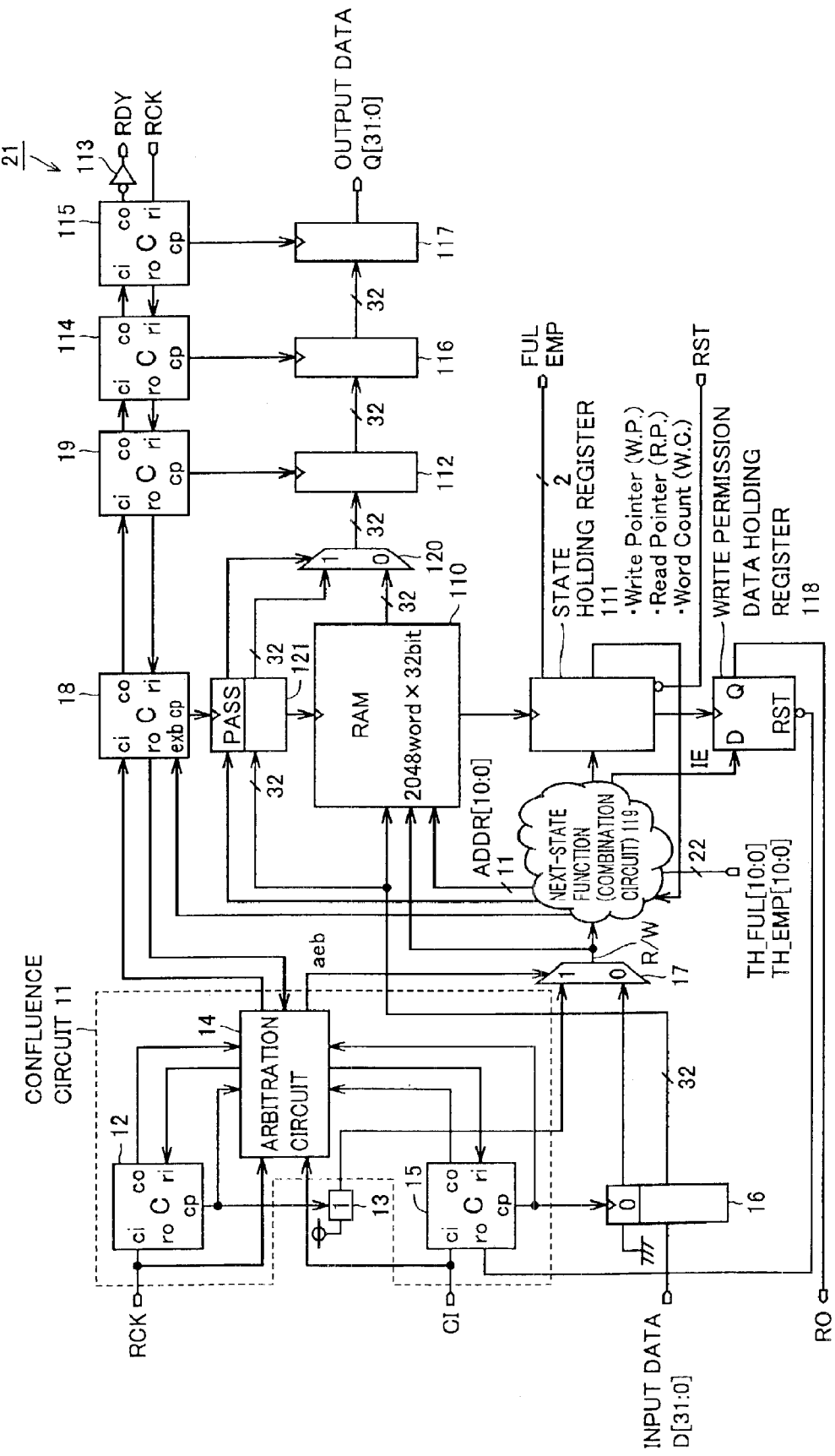
FIG. 1 is a circuit diagram of a self-synchronous FIFO memory device according to the present invention.

Next, self-synchronous FIFO memory device 21 shown in FIG. 1 will be described in detail. In FIG. 1, CI terminal receives the write request signal from external device 22, and RO terminal outputs the writable flag to external device 22. CI terminal is connected to a ci terminal of C element 15 in the first stage, and RO terminal is connected to output node Q in a write permission data holding register 118. C element 15 forms a data transmission path in the first stage, along with one bit fixed to "L" level and a pipeline register 16 consisting of a flip-flop for storing 32-bit data. A terminal RDY outputs the read data present flag to external device 23, and a terminal RCK receives the read request signal from external device 23.

Terminal RCK is connected to ri terminal, and terminal RDY is connected to co terminal via an inverter 113, in C element 115 in the fifth stage, which is the last stage. C element 115 forms a data transmission path in the final stage (fifth stage) along with a pipeline register 117. In addition, terminal RCK is also connected to a ci terminal of C element 12 in the first stage on the other end, and forms another data transmission path in the first stage, along with a pipeline register 13 (1 bit fixed to "H"). An RAM 110 storing 2046 32-bit data; a state holding register 111 controlling a write address (Write Pointer, hereinafter denoted as W.P.)/read address (Read Pointer, hereinafter denoted as R.P.) to the RAM determined by a next-state function 119, a count of the data in the FIFO memory device (Word Count, hereinafter denoted as W.C.), a full state flag (FUL), and an empty state flag (EMP); write permission data holding register 118; a pipeline register 121; and a C element 18 in the second stage together form a data transmission path in the second stage.

Figure 3:
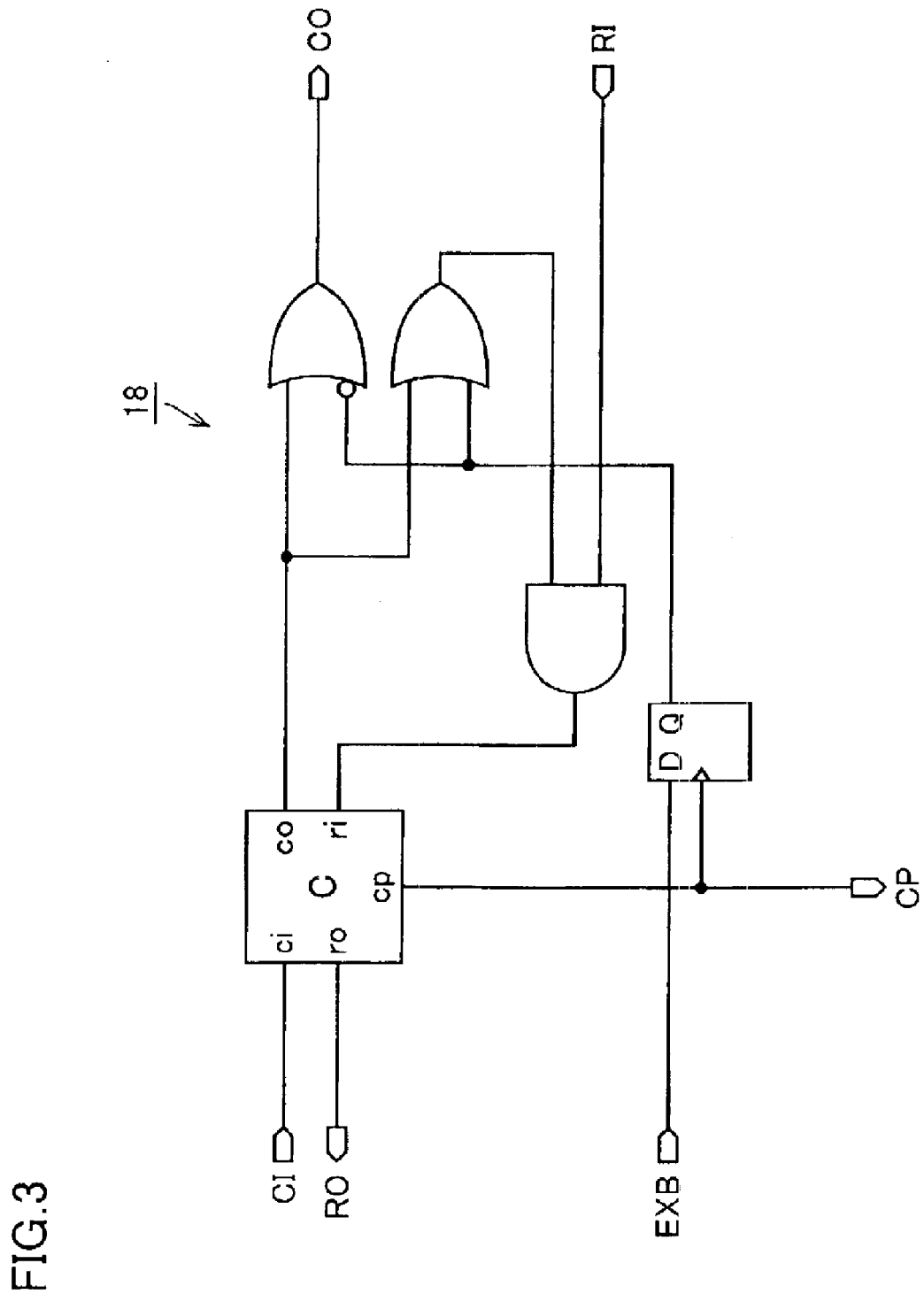
FIG. 3 is a block diagram showing a configuration of a C element in FIG. 1.

Unlike other C elements, C element 18 has a function to erase data. When "L" is input to an exb terminal, data transfer handshaking with a C element 19 in the subsequent stage is not established. FIG. 3 shows a circuit according to one embodiment of C element 18. On the other hand, when the "H" level signal is input to the exb terminal, normal data transfer handshaking is established.

State holding register 111 has a next initial value set by an asynchronous reset signal ("L" signal) input from a terminal RST. That is, as initial values, the write address (W.P.), the read address (R.P.) and the count of the data within the FIFO memory device (W.C.) are all set to 0; the EMP flag is set to 1; and the FUL flag is set to 0, respectively. When write permission data holding register 118 has the "L" level signal from the ro terminal of C element 15 input at its input node RST (that is, asynchronous reset is applied), it outputs the "L" level signal to RO terminal. When write permission data holding register 118 receives a pulse signal of "H" level from a cp terminal of C element 18, it receives a data write permission signal IE input from next-state function 119, for output to RO terminal.

An arbitration circuit 14 forms a confluence circuit 11 along with two C elements 12 and 15 in the first stage, and adjusts a timing for data transfer so that data transfer from the data transmission path in the first stage to the data transmission path in the second stage does not overlap data transfer from the data transmission path in the first stage to the data transmission path in the second stage on the other side. In other words, when the write request clock ("L" level pulse signal) from CI terminal and the read request clock ("L" level pulse signal) from terminal RCK are input substantially simultaneously, either one of C element 12 or C element 15, having the fall of the "L" level pulse signal input earlier than the other, establishes handshaking with C element 18.

Figure 4:
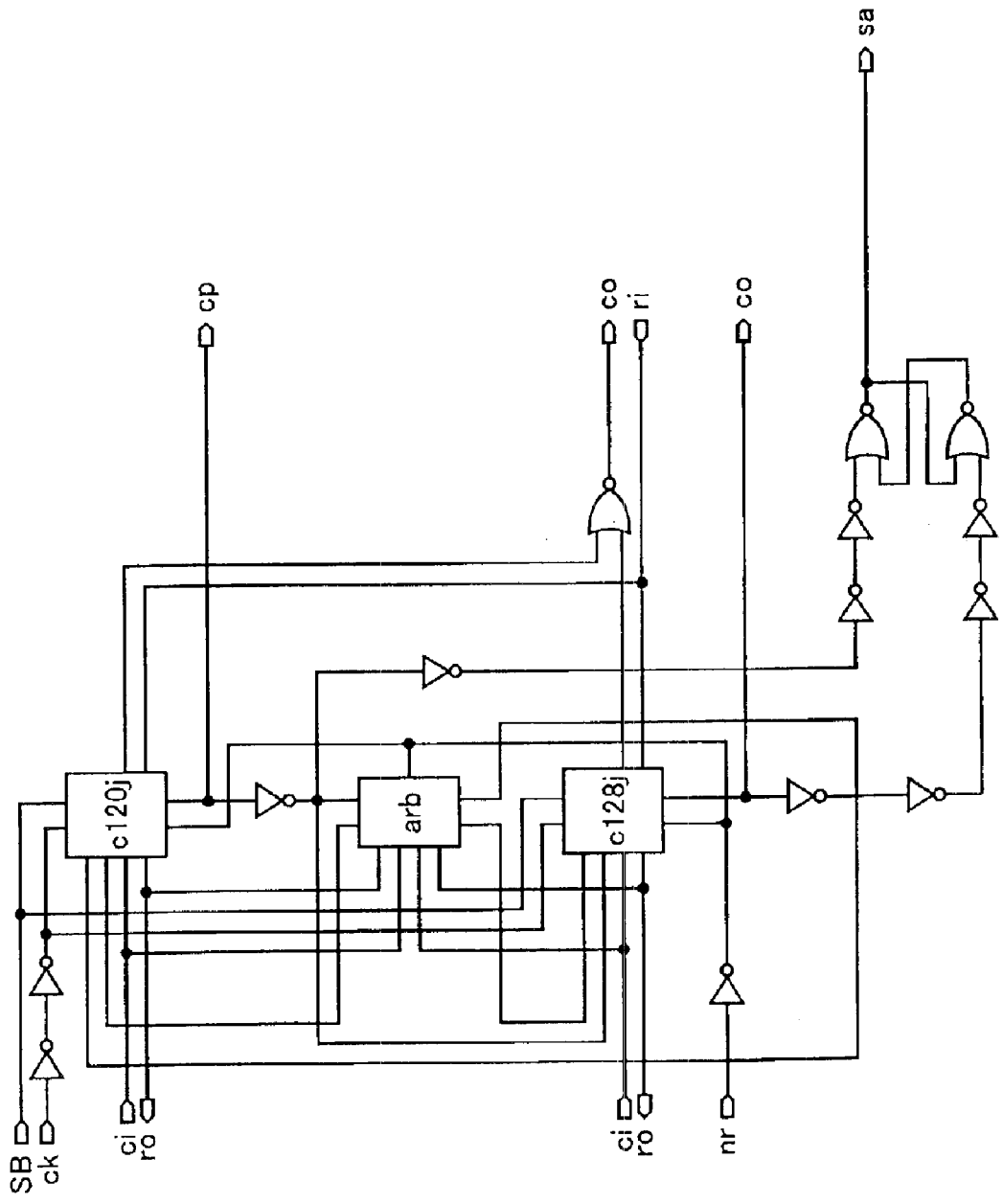
FIG. 4 is a block diagram showing a configuration of a confluence circuit in FIG. 1.
Figure 5:
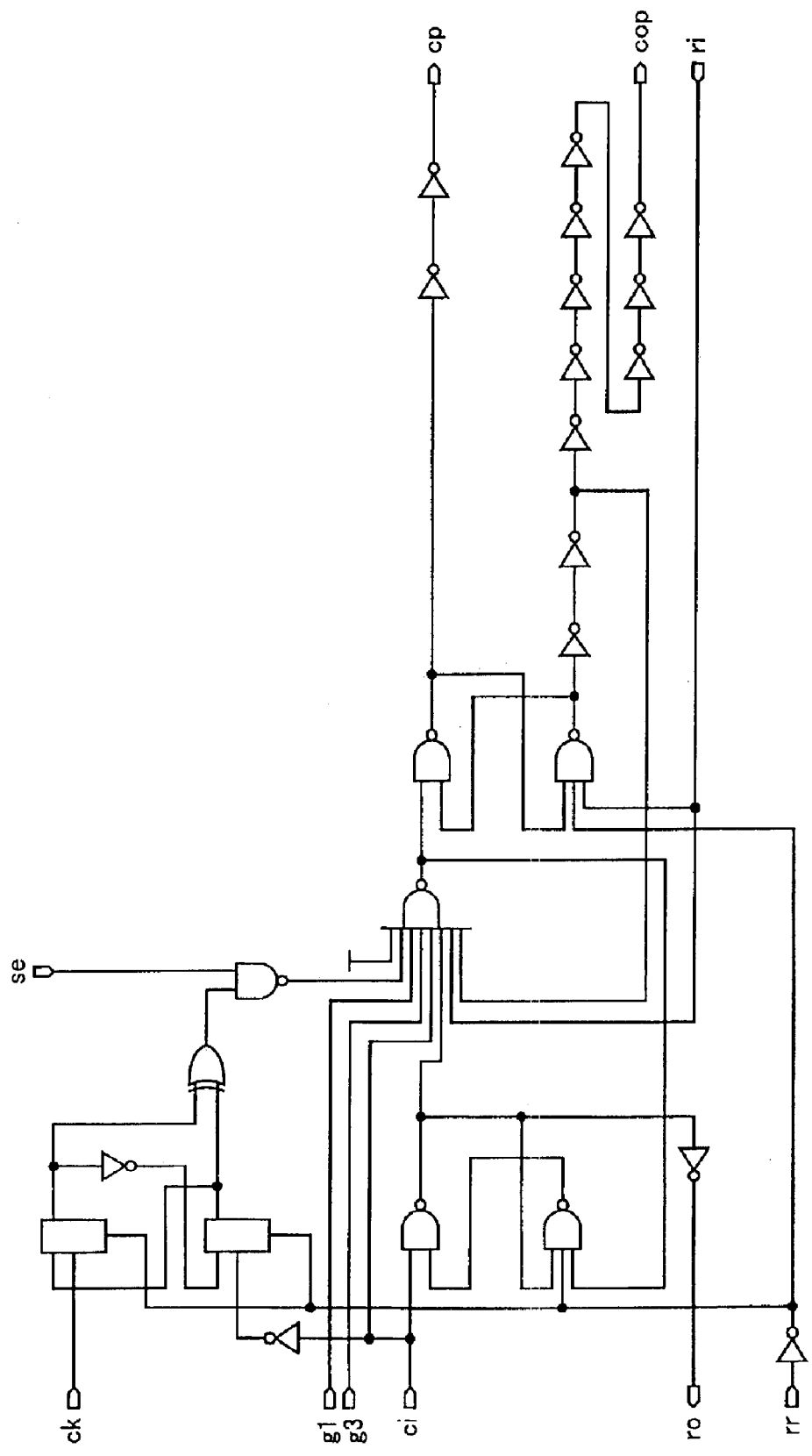
FIG. 5 shows an example of a circuit diagram of a self-synchronous transfer control circuit applied in FIG. 1.
Figure 6:
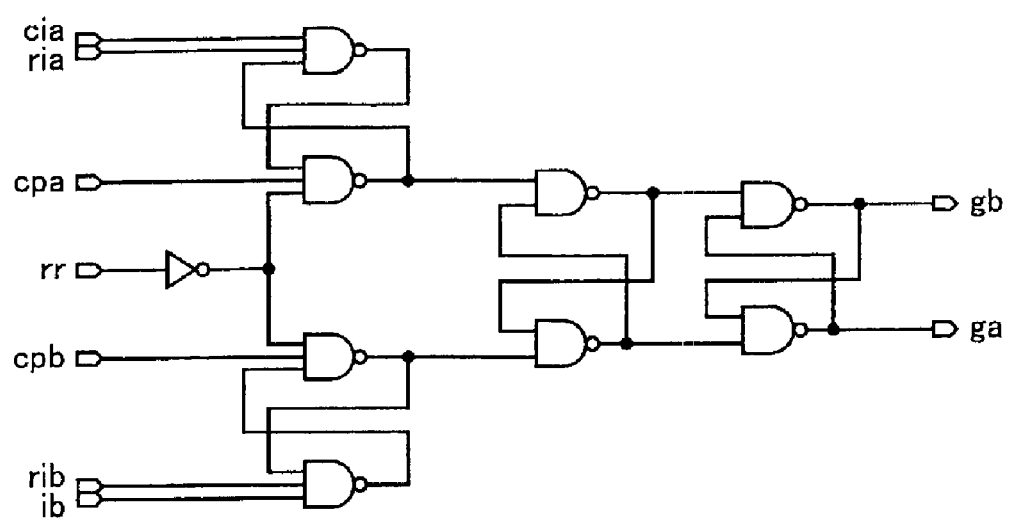
FIG. 6 shows an example of a circuit diagram of an arbitration circuit applied in FIG. 1.

After data transfer through this handshaking is completed, the other C element 12 or 15 establishes handshaking with C element 18. FIG. 4 shows a circuit according to one embodiment of confluence circuit 11. Moreover, FIG. 5 shows a circuit according to one example of a submodule c120j used in FIG. 4, while FIG. 6 shows a circuit according to one example of a submodule arb. Since Japanese Patent Laying-Open No. 2-1666 discloses a technique analogous to this confluence circuit, description for confluence circuit 11 will not be provided.

C element 19 forms a data transmission path in the third stage along with pipeline register 112 for storing 32-bit data, and similarly, C element 114 forms a data transmission path in the fourth stage along with pipeline register 116. A selector 17 outputs as an R/W signal (Read: 1, Write: 0) to next-state function 119, upon receiving an "L" level fixed signal of 1 bit of pipeline register 16 when the write clock is input from CI terminal, and selector 17 outputs as the R/W signal (Read: 1, Write: 0) to next-state function 119, upon receiving an "H" level fixed signal of 1 bit of pipeline register 13 when the read clock is input from terminal RCK.

Next-state function 119 performs an operation shown in FIGS. 10 and 11 described below, in accordance with the R/W signal input from selector 17 and the count of the data within the self-synchronous FIFO memory device (Word count) input from state holding register 111. The operation will be described later. A selector 120 selects whether to output 32-bit data stored in register 121 or to output 32-bit data read from RAM 110, in accordance with a PASS flag output from next-state function 119 and stored in register 121.

Terminals TH_FUL/TH_EMP receive from the outside, a reference value for determining the full state/empty state of the count of the data within the FIFO memory device. Terminals FUL/EMP output a result from determination of the full state/empty state within next-state function 119 with TH_FUL/TH_EMP and the count of the data within the FIFO memory device.

Figure 7:
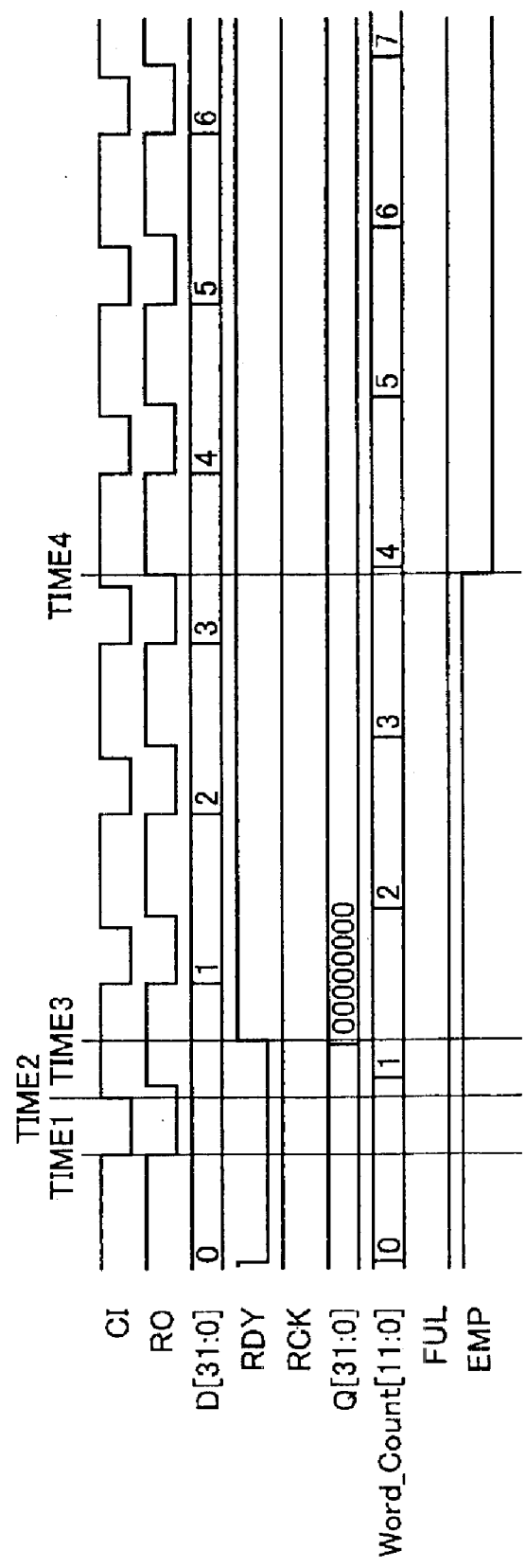
FIG. 7 shows a section illustrating a start of data write in a timing chart of the self-synchronous FIFO memory device in FIG. 1.
Figure 8:
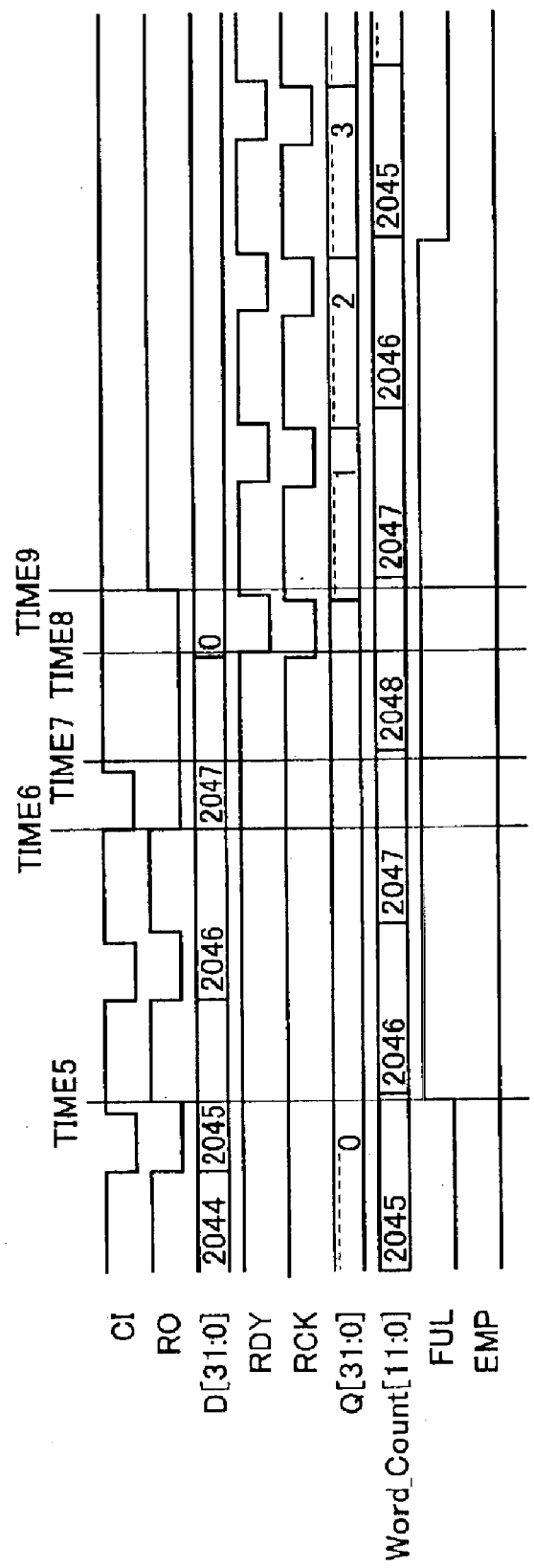
FIG. 8 shows a section in which the self-synchronous FIFO memory device attains a stored data full state through data write, in the timing chart of the self-synchronous FIFO memory device in FIG. 1.
Figure 9:
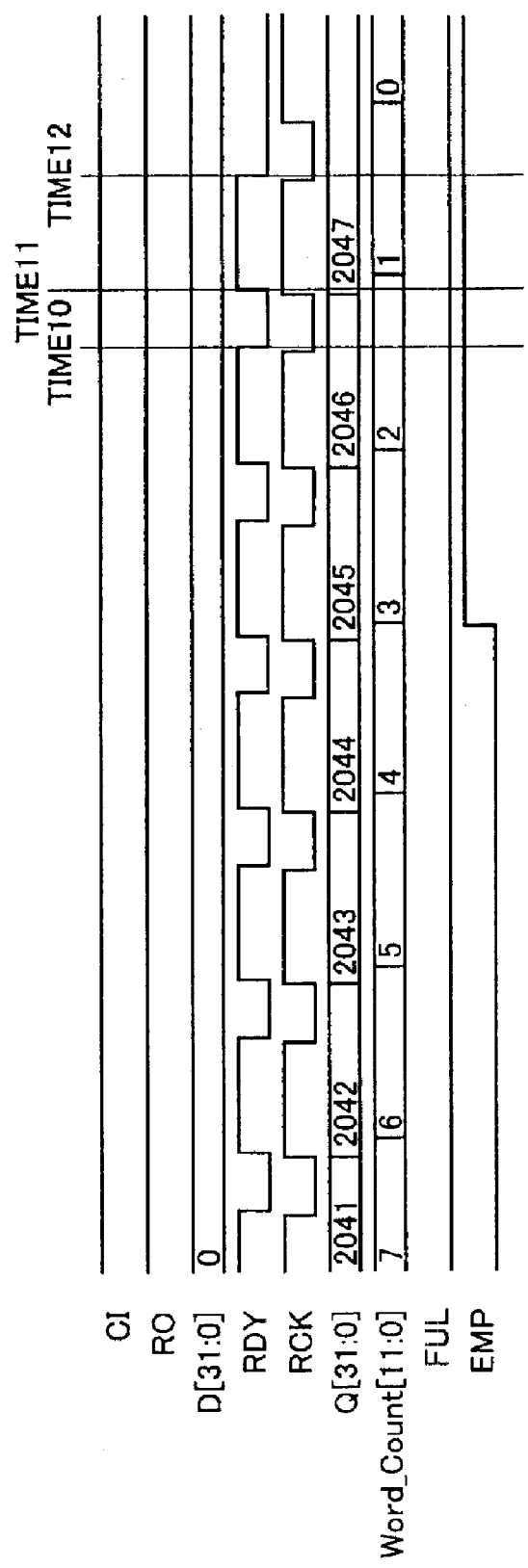
FIG. 9 shows a section in which the self-synchronous FIFO memory device attains a stored data empty state through data read, in the timing chart of the self-synchronous FIFO memory device in FIG. 1.

Next, with reference to timing charts shown in FIGS. 7 to 9, an operation of the self-synchronous FIFO memory device in FIG. 1 will be described. From the empty state in which no data has been written in the self-synchronous FIFO memory device, 2048 write clocks ("L" pulse signals) are input from CI terminal to write 2048 32-bit data. After the self-synchronous FIFO memory device attains the data full state, 2048 read clocks ("L" pulse signals) are input from terminal RCK to read 2048 32-bit data. In this procedure, FIG. 7 shows a timing chart of a section in which data write is performed several times from the empty state where data is not present within the FIFO memory device; FIG. 8 shows a timing chart of a section in which data read is performed several times after the FIFO memory device has attained the full state through data write; and FIG. 9 shows a timing chart of a section in which the FIFO memory device attains the empty state as a result of several data read, respectively. In addition, in these examples, the write clock is input from CI terminal and the read clock is input from terminal RCK both with a cycle of 30 ns (operation frequency 33 MHz). The TH_EMP terminal is set to 3, while the TH_FUL terminal is set to 2046.

As shown in FIG. 7, when the data in the self-synchronous FIFO memory device is at the initial state, that is, "0" (immediately after the input of an RST reset signal), there is no data to be read. Therefore, read data present flag RDY is set to "L" level. In addition, a value in a W.C. field within the state holding register (the count of the data within the self-synchronous FIFO memory device) indicates "0". When the first data (data number 0) is written from this state (that is, the first write clock ("L" level pulse signal) is input from CI terminal (FIG. 7: TIME1)), C element 15 performs a normal transfer operation shown in FIG. 15, and the "H" level pulse signal is output from the cp terminal of C element 15. Pipeline register 16 receives the "H" level pulse signal, and latches the first 32-bit data (data number 0) input from terminal D and the 1-bit signal (a value thereof is carried later as the R/W signal), which is output to the data transmission path in the subsequent stage.

A data transfer request pulse ("L" level pulse signal) is output from the co terminal of C element 15 to arbitration circuit 14. Arbitration circuit 14 transmits the "L" level pulse signal to the ci terminal of C element 18, and transmits the data transfer permission signal from the ro terminal of C element 18 to the ri terminal of C element 15. At the same time, "0" indicating that data has been input from C element 15 is output from an aeb terminal in arbitration circuit 14 to selector 17. Selector 17 receives this signal "0", and outputs the 1-bit signal (signal value 0) input from pipeline register 16 to next-state function 119 and RAM 110 as the R/W signal.

Figures 11, 12:
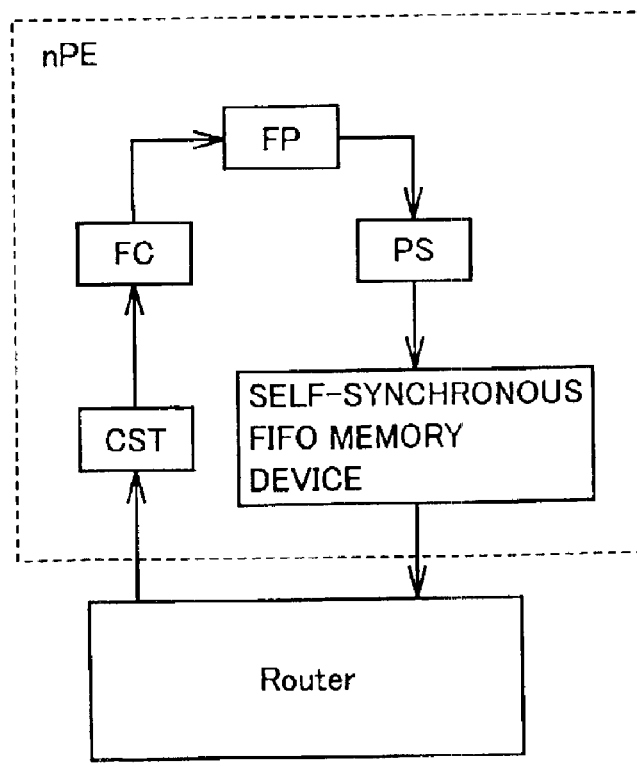
Figure 13:
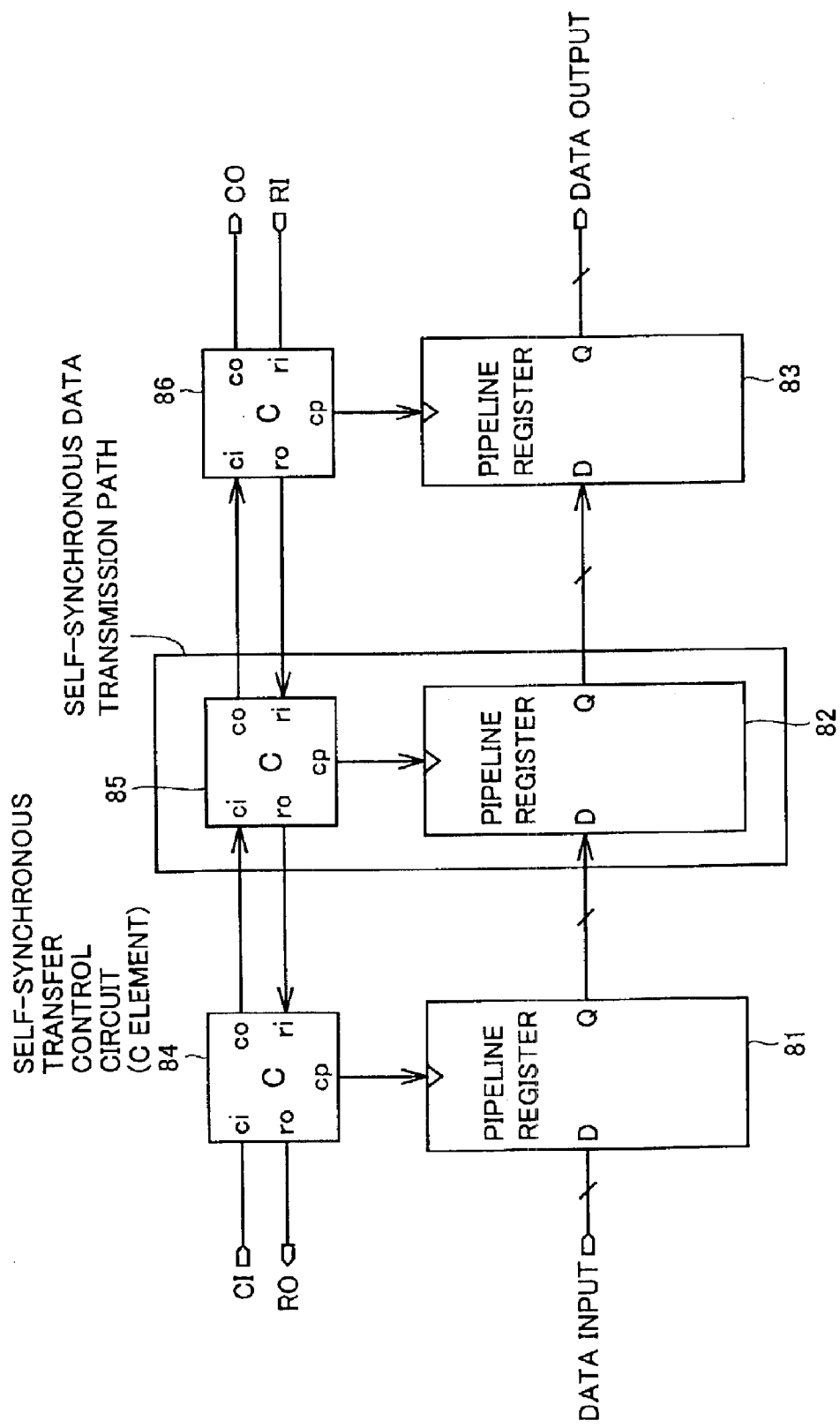
FIG. 13 shows a configuration of a conventional FIFO memory device having a self-synchronous data transmission path cascaded.
Figure 14:
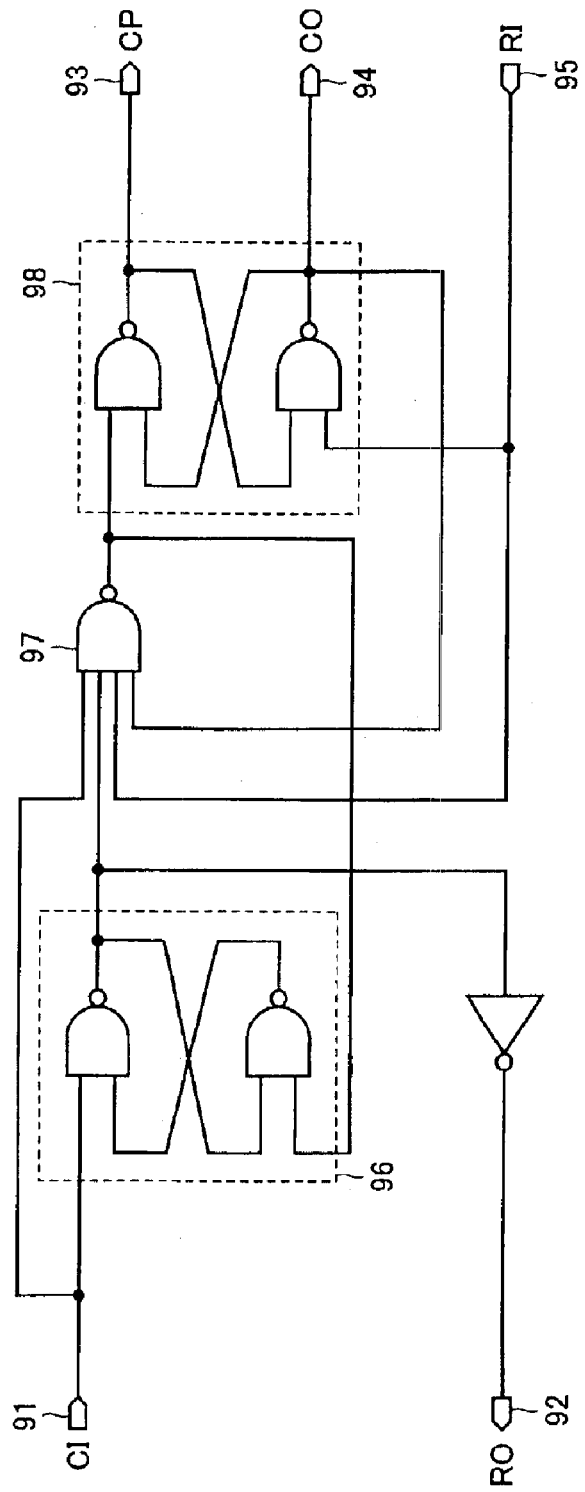
FIG. 14 shows an example of a circuit diagram of a self-synchronous transfer control circuit (a C element) applied in an embodiment according to a conventional art and the present invention.

Next-state function 119 receives the R/W signal (signal value 0) as well as Write Pointer (W.P., initial value 0), Read Pointer (R.P., initial value 0), and Word Count (W.C., initial value 0) signals from state holding register 111, and performs an operation based on state transition charts shown in FIGS. 10 and 11. That is, this example corresponds to CASE (A) in FIG. 10. Here, W.P. and R.P. output "0", which is a value as they are input, and W.C. outputs "1" resulting from increment by 1, to state holding register 111. In addition, since "3" and 2046 are input from terminal TH_EMP and terminal TH_FUL respectively, this example corresponds to CASE (J), (M) in FIG. 11. Here, "0" is output as the FUL signal, and "1" is output as the EMP signal, to state holding register 111. At the same time, "1" is output as a data erasing signal EXB to C element 18, "1" is output as a data pass signal PASS to pipeline register 121, and "1" is output as data write permission signal IE to write permission data holding register 118, respectively.

C element 18 receives the "L" level pulse signal from the co terminal of C element 15. On the other hand, since the exb terminal has the "H" level signal input, normal data transfer is performed at a timing shown in FIG. 15, without erasing data. Consequently, the "H" level pulse signal is output from the cp terminal of C element 18. The "H" level pulse signal is received by 4 types of registers and memories described below, which are operated. In other words, pipeline register 121 latches a PASS signal 1 from next-state function 119 and 32-bit write data (data value 0) output by pipeline register 16, which are output to selector 120 respectively.

RAM 110 receives an R/W signal 0 (indicating write) output by selector 17, an address signal ADDR (a value thereof is 0, which is a value for W.P.) output by next-state function 119, and 32-bit write data (data number 0) output by pipeline register 16, and writes the 32-bit data (data number 0) to memory address 0. This data, however, is insignificant, because this data is overwritten by the data input by the next write clock. State holding register 111 latches five types of values of W.P., R.P., W.C., FUL, EMP output by next-state function 119, and outputs W.P., R.P. and W.C. to next-state function 119 and FUL, EMP to terminals FUL, EMP. Write permission data holding register 118 latches IE (value 1) output by next-state function 119, which is output to RO terminal. As a result, "H" is output from RO terminal, which indicates readiness for reception of the next write clock (TIME 2 in FIG. 7).

Figure 15:
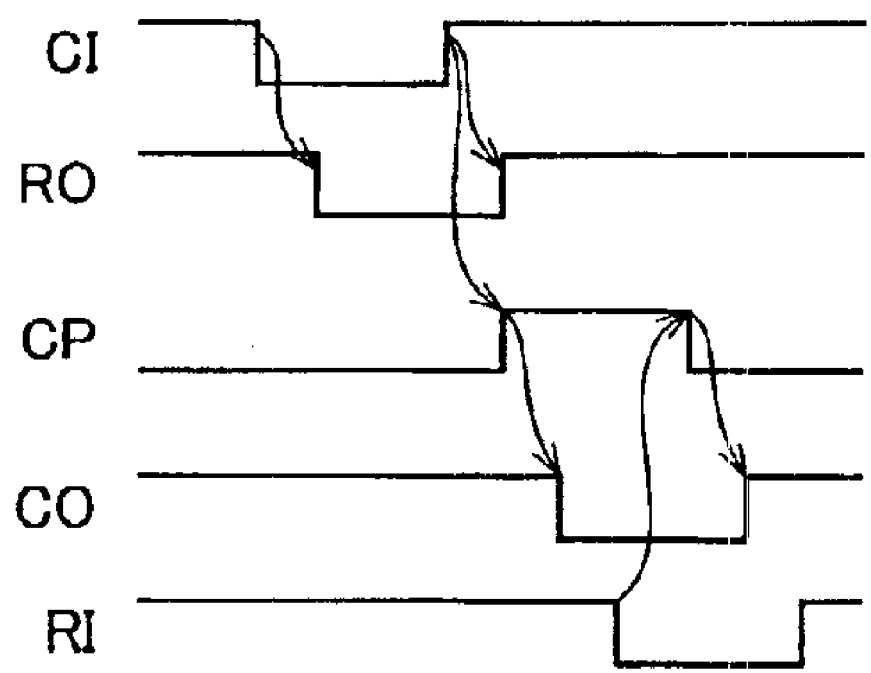
FIG. 15 shows an example of a timing chart of the self-synchronous transfer control circuit (C element) in FIG. 14.
Figure 16:
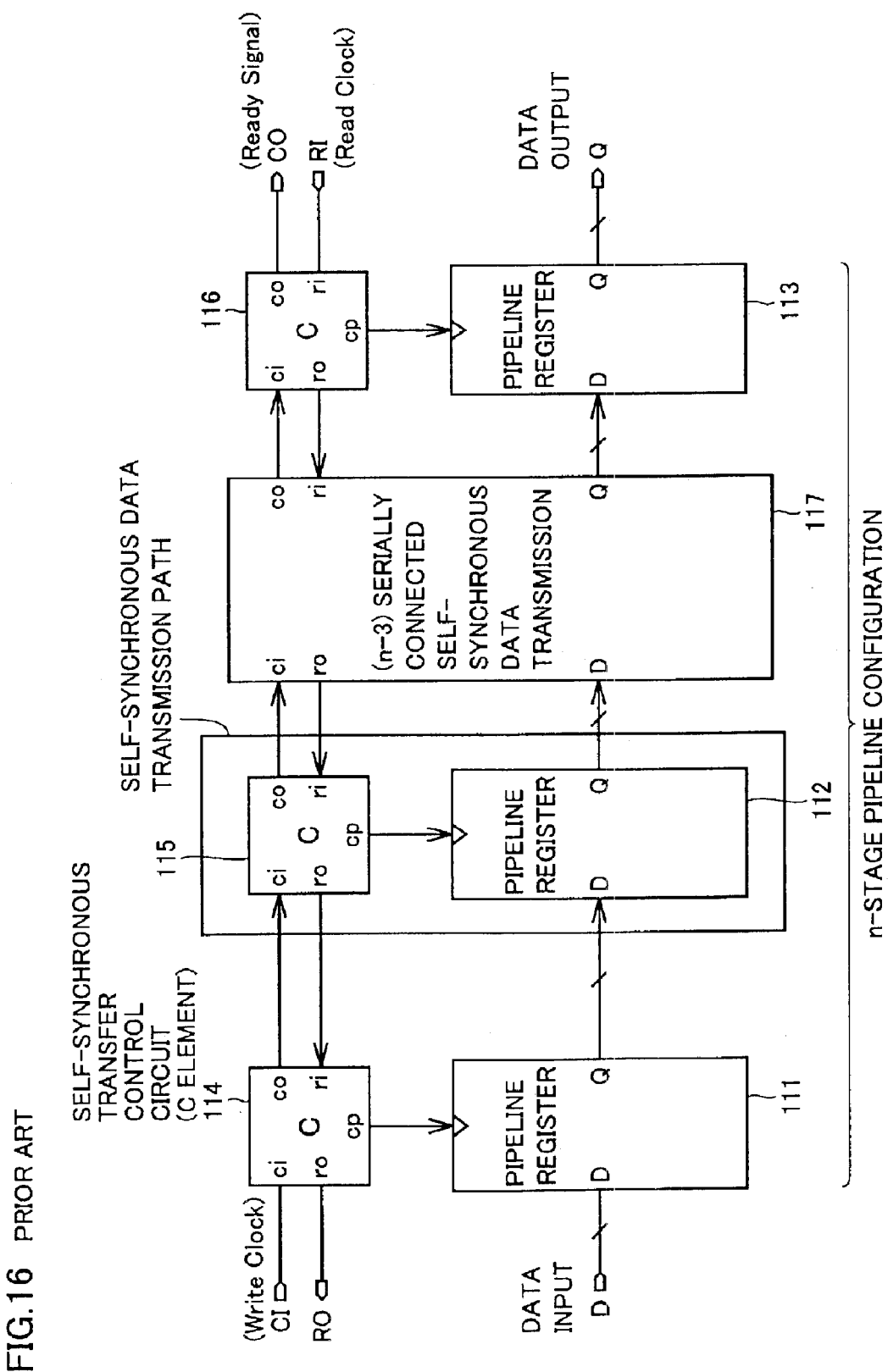
FIG. 16 shows a configuration of a conventional self-synchronous FIFO device having the self-synchronous data transmission path cascaded.
Figure 17:
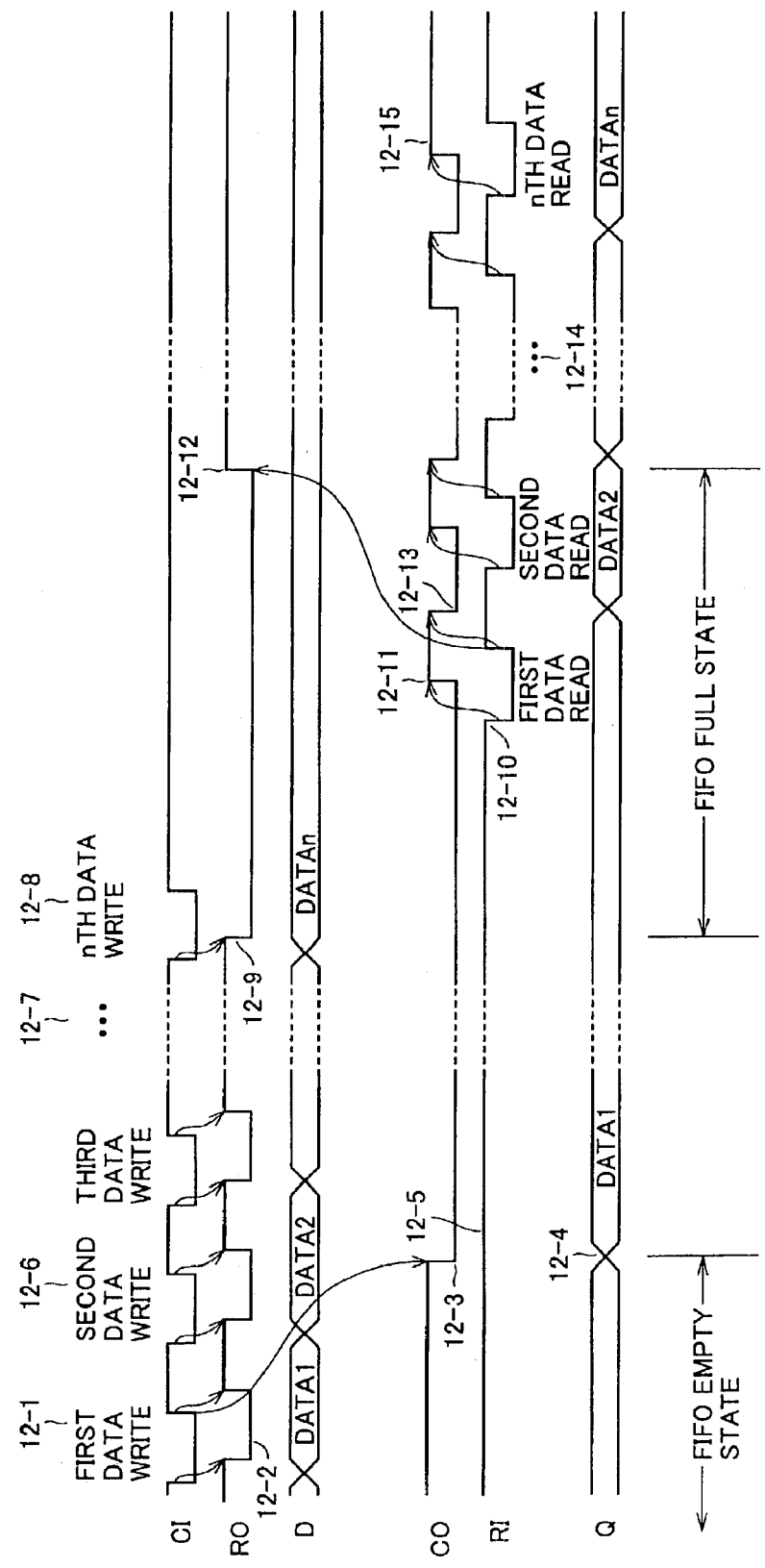
FIG. 17 shows an example of a timing chart of the self-synchronous FIFO device in FIG. 16.

Next, the "L" level pulse signal is input to the ci terminal of C element 19 from the co terminal of C element 18, and C element 19 performs a normal transfer operation shown in FIG. 15 in a manner similar to C element 18. Since selector 120 has PASS signal 1 input, it selects 32-bit data (data number 0) input from pipeline register 121, which data is output to pipeline register 112. C element 19 outputs the "H" pulse signal from the cp terminal through the normal transfer operation. Pipeline register 112 receives the "H" level pulse signal, and latches the 32-bit data (data number 0) input from selector 120, which is output to pipeline register 116. The "L" level pulse signal is transferred from the co terminal of C element 19 to the ci terminal of C element 114. C element 114 performs the transfer operation similar to C element 19, and pipeline register 116 latches the first write data (data number 0), which is output to pipeline register 117.

The ci terminal of C element 115 receives the "L" level pulse signal from the co terminal of C element 114, and outputs the "L" level pulse signal to the ri terminal of C element 114 as well as the "H" signal from the cp terminal. Pipeline register 117 latches the first write data (data number 0) at the rise of the cp signal of C element 115, which is output to output terminal Q. In addition, "L" is output from the co terminal of C element 115. Behavior hitherto is similar to the normal transfer operation, as with C element 19 or 114. Here, since the read dock is not input from terminal RCK, the ri terminal of C element 115 continues to have the "H" level signal input. In addition, the "H" level signal and the "L" level signal continue to be output from the cp terminal and the co terminal respectively. The "H" level signal, which is an inverted signal of the "L" level signal of the co terminal of C element 115, is output via inverter 113 from read data present flag terminal RDY, which indicates that the data to be read is present (FIG. 7: TIME 3).

Therefore, the first write data (data number 0) input with the write clock bypasses the RAM in the second stage of the pipeline, and is held in the pipeline register in the last stage (fifth stage).

The second write data (data number 1) input from terminal D with the write clock from CI terminal increments W.C. as with the first write data, as shown in CASE (B) in FIG. 10. The second write data bypasses the RAM, and is transferred to the pipeline register in the subsequent stage. Since the first write data (data number 0) has been held in pipeline register 117, data transfer handshaking is not established between C element 114 and C element 115. Consequently, the second write data (data number 1) is carried as far as pipeline register 116, and a state in which the second write data is held here is maintained.

From the third write data (data number 2), an operation of the self-synchronous FIFO memory device slightly differs. When the third data is input from terminal D with the write clock, in accordance with CASE (C) in FIG. 10, a W.P. value "0" is output as an address value ADDR to the RAM, an EXB value "0" is output to C element 18, and an IE value "1" is output to write permission data holding register 118. This is because next-state function 119 has had W.C. value "2", W.P. value "0", R.P. value "0", and R/W value "0" input. In addition, the next-state function 119 outputs values obtained by incrementing W.C. and W.P. respectively (W.C.=3, W.P.=1) and R.P. value "0" as it is input to state holding register 111.

These values are used when a next write request or read request is issued. When the ci terminal of C element 18 receives the data transfer request pulse ("L" level pulse signal) from the co terminal of C element 15, C element 18 outputs a data reception completion pulse ("L" level pulse signal) from the ro terminal to the ri terminal of C element 15, as well as outputs the "H" level pulse signal from the cp terminal. In response to the rise of the "H" level pulse signal from the cp terminal, RAM 110 writes 32-bit data (data number 2) in address 0. In addition, state holding register 111 latches W.P., R.P., W.C., FUL, EMP signals output by next-state function 119, and write permission data holding register 118 latches the IE value "1" output from next-state function 119, which is output to RO terminal.

Since C element 18 has "0" ("L" signal) input from the exb terminal, it inputs the "L" pulse signal output from the co terminal to the ri terminal (see FIG. 3). As a result, the "L" pulse signal is not output to the ci terminal of C element 19 (the "H" signal continues to be output). That is, data transfer to C element 19 is not performed, but data appears to be erased in the second stage of the pipeline (data has been erased, but has been written in the RAM).

With regard to the write data from this time forward, an operation similar to that for the third data write described above is performed. That is, when the write data is input with the write clock from CI terminal, the "L" level signal is output from RO terminal to prohibit further data write. Then, the data is written into the incremented write address of the RAM, to erase the transfer data. Moreover, the "H" level signal is output from RO terminal, and next write data input is permitted. Though the write data is set to an arbitrary value, a value incremented one by one is input here.

In writing of the fourth data onward, a state of an input signal of next-state function 119 corresponds to CASE (K), (M) in FIG. 11. Therefore, terminal EMP and terminal FUL both output the "L" level signal (FIG. 7: TIME 4). In addition, in writing the 2046 th to 2048th data, the state of the input signal of next-state function 119 corresponds to CASE (K), (L) in FIG. 11. Therefore, terminal EMP outputs the "L" level signal, and terminal FUL outputs the "H" level signal (FIG. 8: TIME 5).

Next, an operation of the FIFO memory device when the 2048th write data is input will be described. When the 2048th write data (data number 2047) is input with the write clock from CI terminal, the "L" level signal is output from RO terminal, and further data write is prohibited (FIG. 8: TIME 6). Next-state function 119 performs an operation shown in CASE (D) in FIG. 10, and the input data (data number 2047) is written into a write address 2045 in the RAM. Since C element 18 receives "0" at the exb terminal, it performs a data erasing operation. In addition, write permission data holding register 118 receives IE value 0 from next-state function 119, and outputs the "L" level signal to RO terminal. That is, a state in which further data write is prohibited is maintained (FIG. 8: TIME 7), and data count 2048 is set as the full state. RO terminal continues to output the "L" level signal until the read clock ("L" level pulse signal) is input from terminal RCK.

A state, in which the first data is stored in pipeline register 117, the second data is stored in pipeline register 116, and the third to 2048th data are stored in RAM 110, is assumed as the full state. From this state, an operation to read all of the 2048 data will now be described.

When the first read clock ("L" level pulse signal) is input from terminal RCK, the "L" level pulse signal is input to the ri terminal of C element 115. The "H" level signal and the "L" level signal continue to be output from the cp terminal and the co terminal of C element 115, respectively. That is, with the "L" level signal input to the ri terminal during data transfer to the outside, the cp terminal of C element 115 falls to "L" level, while the co terminal rises to "H" level. Thus, the first data read (data number 0) is normally terminated. In addition, the signal of terminal RDY input falls to "L" level (FIG. 8: TIME 8), which indicates that the read data is not present in pipeline register 117 in the last stage.

When the input from ri terminal (terminal RCK) of C element 115 rises to "H" level, this is regarded as permission of next data output. Therefore, the second write data (data number 1) stored in pipeline register 116 is transferred to pipeline register 117 in response to the rise to "H" level of the cp terminal of C element 115, for output from output terminal Q. In addition, since the "L" level signal indicating that the data is being transferred is output from the co terminal, via inverter 113, the signal of terminal RDY input again rises to "H" level, which indicates that the read data is present in the pipeline register in the last stage.

On the other hand, the first read clock ("L" level pulse signal) input from terminal RCK is input also to the ci terminal of C element 12. Therefore, the "H" level pulse signal is output from the cp terminal of C element 12. One-bit register 13 latches "1", and outputs "1" to selector 17. Arbitration circuit 14, upon receiving the "L" level pulse signal of terminal RCK and the "H" level pulse signal from the cp terminal of C element 12, establishes handshaking between C element 12 and C element 18, and outputs "1" from terminal aeb. In other words, the data transfer request signal ("L" level pulse signal) from the co terminal of C element 12 is input to the ci terminal of C element 18. Selector 17 selects a signal value "1" from 1-bit register 13, and outputs the value as the R/W signal to RAM 110 and next-state function 119.

Since next-state function 119 has W.P. value "2045", R.P. value 0, W.C. value "2048", and R/W value "1" input, it performs an operation shown in CASE (I) in FIG. 10. That is, next-state function 119 outputs R.P. value "0" as address ADDR to RAM 110; EXB signal value "1" to C element 18; IE value "1" to write permission data holding register 118; PASS signal "0" to data register 121; and W.P. value "2045" (maintaining the input value), R.P. value "1" (obtained by incrementing the input value by one), and W.C. value "2047" (obtained by decrementing the input value by one) to state holding register 111. In addition, next-state function 119 outputs FUL value "1" and EMP value "0" through an operation in. CASE (O), (P) in FIG. 11.

When the ci terminal of C element 18 receives the "L" level pulse signal from the co terminal of C element 12 via arbitration circuit 14, C element 18 performs the normal transfer operation at the timing shown in FIG. 10, because an exb signal 1 is input from next-state function 119. As a result, the "H" level pulse signal is output from the cp terminal of C element 18. Four types of registers and memories shown below receive this "H" level pulse signal, and operate respectively. In other words, upon receiving R/W signal value "1" (read) from selector 17 and ADDR value "0" from next-state function 119, RAM 110 reads the data stored at address 0 (data written in the third place), for output to selector 120. Pipeline register 121 latches PASS value "0" from next-state function 119, which is output to selector 120. State holding register 111 latches five signals from next-state function 119, that is, W.P., R.P., W.C., FUL, EMP, and outputs W.P., R.P. and W.C. to next-state function 119, and outputs signals FUL, EMP to terminal FUL and terminal EMP, respectively. Write permission data holding register 118 latches IE value "1" from next-state function 119, which is output to RO terminal (FIG. 8: TIME 9). Thus, the write prohibition state is reset.

Since selector 120 receives PASS signal value "0" from pipeline register 121, it selects the 32-bit data (data number "2") read from a memory at address 0, which is output to pipeline register 112. Since the data has been stored in pipeline register 117, the data read from the memory is carried as far as pipeline register 116 through the transfer operation of C elements 19 and 114. Thus, the state in which the data is held in pipeline register 116 is maintained.

When the second read clock ("L" level pulse signal) is input from terminal RCK as well, the self-synchronous FIFO memory device performs an operation the same as in input of the first read clock. That is, the data held in pipeline register 117 is read, the data held in pipeline register 116 is transferred to pipeline register 117, and the data stored at an address following the data previously read from RAM 110 is read, which data is carried to pipeline register 116 and held therein. This operation is repeated until the 2046th read clock is input (FIGS. 8 and 9). When the 2046th read clock is input and data read is completed, the data to be read no longer exists in RAM 110. Here, a state in which remaining two read data are held in pipeline registers 116, 117 is attained.

When the 2047th read clock is input from terminal RCK, reading of the data (data number 2046) held in pipeline register 117 is completed with the fall to "L" level of terminal RCK (FIG. 9: TIME 10). In addition, when the signal of terminal RCK input rises to "H" level, the data held in pipeline register 116 (data number 2047) is transferred to pipeline register 117, and read data present flag RDY rises (FIG. 9: TIME 11).

On the other hand, though C element 12 establishes handshaking for data transfer with C element 18 with the read clock ("L" level pulse signal) input to the ci terminal of C element 12, "0" is input to the exb terminal of C element 18, because next-state function 119 performs an operation in CASE (H) in FIG. 10. Thus, C element 18 performs the data erasing operation, and does not request data transfer to C element 19 or to a subsequent element.

When the 2048th read clock is input from terminal RCK as well, reading of the data (data number 2047) held in pipeline register 117 is completed, as with the 2047th read clock (FIG. 9: TIME 12). Since the data to be read no longer exists in the self-synchronous FIFO memory device, the read data present flag continues to output "L" level.

Meanwhile, though C element 12 establishes handshaking for data transfer with C element 18 with the read clock ("L" level pulse signal) input to the ci terminal of C element 12, "0" is input to the exb terminal of C element 18, because next-state function 119 performs an operation in CASE (G) in FIG. 10. Thus, C element 18 performs the data erasing operation, and does not request data transfer to C element 19 or to a subsequent element.

In a state in which the data to be read no longer exists in the self-synchronous FIFO memory device, even when the read clock enters from terminal RCK, the next-state function 119 performs an operation in CASE (F) in FIG. 10, and C element 18 performs the data transfer erasing operation. Therefore, a wrong operation such as generation of wrong read data can be avoided.

The circuit shown in FIG. 1 shows one embodiment for implementing the self-synchronous FIFO memory device according to the present invention, and the self-synchronous FIFO memory device can be implemented without providing three, that is, third to fifth, pipeline stages in FIG. 1. In that configuration, however, when the read clock is input, the data is read from the RAM after the read request is transferred to the first pipeline stage and to the second pipeline stage. That is, a time for reading is extended. Therefore, in order to attain quicker response of data output with respect to the input read clock, as well as to perform efficient, continuous data read, it is desirable to arrange several data transmission paths after the second pipeline stage including the RAM as shown in FIG. 1. In doing so, the data to be read next is always stored in the pipeline register in the last stage, and efficient data read can be achieved.

In addition, a read/write data width of 32 bits and the size of the RAM of 2048 words×32 bits shown in the example of FIG. 1 are by way of example, and do not have to be set to such values. An arbitrary read/write data width and a memory of an arbitrary size are also applicable.

The self-synchronous FIFO memory device according to the present invention uses externally input full flag threshold value (TH_FUL)/empty flag threshold value (TH_EMP), to output full flag (FUL)/empty flag (EMP) separately when the count of the data stored within the self-synchronous FIFO memory device is above or below those threshold values. An application utilizing this fact will now be described.

Figure 18:
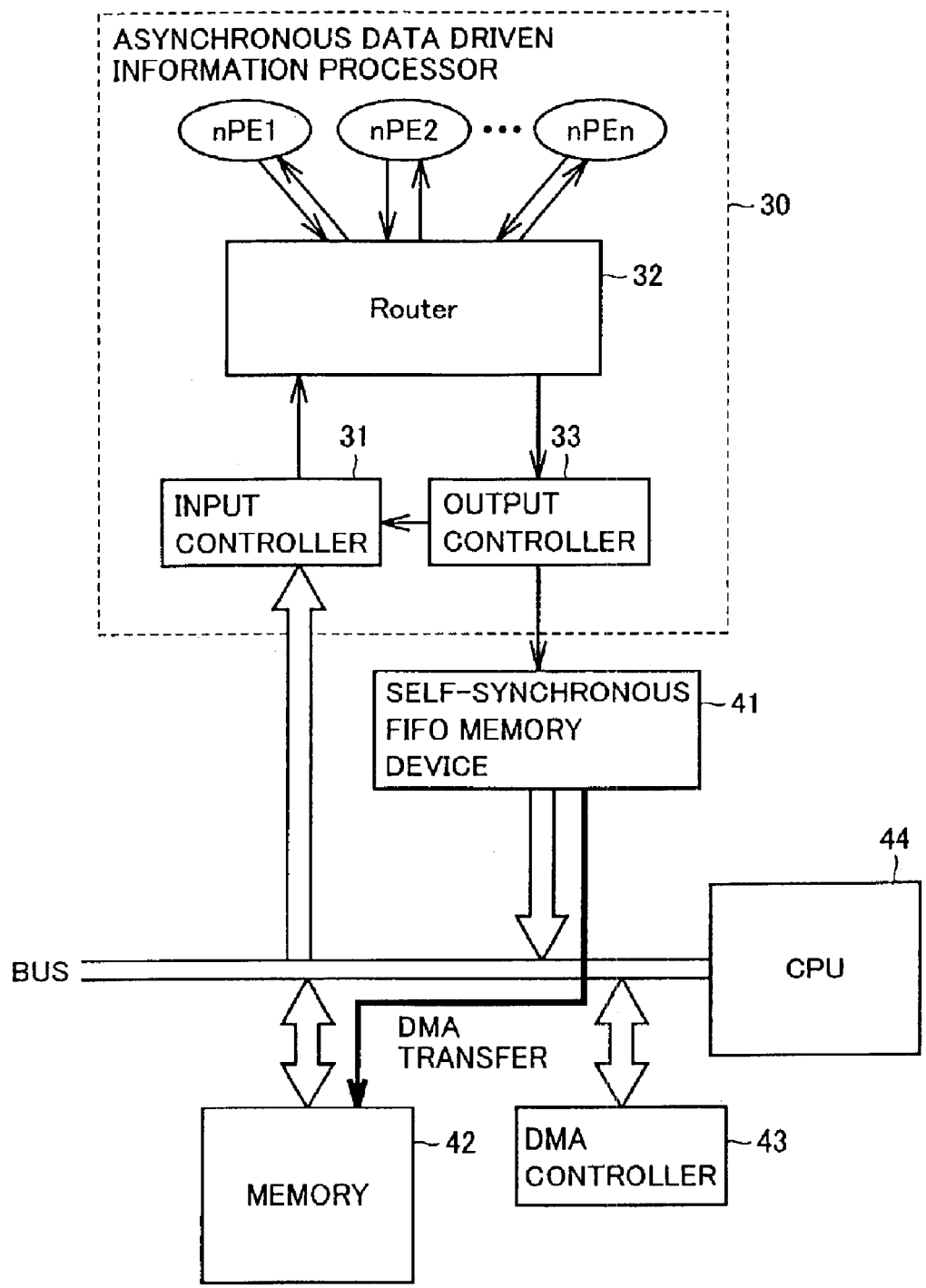
FIG. 18 shows an application of a self-synchronous FIFO memory device.

Referring to FIG. 18 in conjunction with the conventional example, an example in which the self-synchronous FIFO memory device according to the present invention is used to interface the asynchronous data driven information processor with the CPU bus will be described. As an application of FIG. 18, consider an example in which DMA controller 43 performs burst transfer by a unit of 256 data from self-synchronous FIFO memory device 41 to memory 42, for instance.

The full flag (FUL in FIG. 1) is connected to DMA controller 43, and the full flag threshold value (TH_FUL in FIG. 1) is set to 256. Self-synchronous FIFO memory device 41 accumulates the data input from asynchronous data driven information processor 30. When the count of the accumulated data exceeds "256", which is the full flag threshold value (that is, when the logically full state is identified), the full flag "H" level is output to DMA controller 43. Upon receiving the "H" level signal, DMA controller 43 acquires a right to use the bus, and performs DMA transfer of 256 data accumulated in the FIFO to memory 42 collectively. Here, since the FIFO is not physically full, the data can be received (data write to the FIFO) from asynchronous data driven information processor 30 in parallel with the DMA transfer processing (data burst read from the FIFO). Therefore, there is no wasted, idle time in the overall system, and efficient data transfer can be achieved.

After completion of 256 DMA transfer (data burst read), DMA controller 43 releases the right to use the bus, and refers to the full flag from the FIFO. When the full flag attains "L" level, DMA controller 43 waits, and when the full flag attains "H" level, it again acquires the right to use the bus to perform the DMA transfer processing. Here, though 256 DMA transfer processing has been described, an example in which self-synchronous FIFO memory device 41 according to the present invention is used to perform further efficient DMA transfer processing will now be described.

As another application of FIG. 18, consider an example in which full flag/empty flag (FUL/EMP in FIG. 1) is connected to the DMA controller, the empty flag threshold value (TH_EMP in FIG. 1) is set to 256, and the full flag threshold value (TH_FUL in FIG. 1) is set to "1024". It is assumed that, upon receiving the "H" level signal as the full flag, DMA controller 43 acquires the right to use the bus to start the DMA transfer processing, and, upon receiving the "H" level signal as the empty flag, it releases the right to use the bus to terminate the DMA transfer processing. Self-synchronous FIFO memory device 41 accumulates the data input from asynchronous data driven information processor 30. When the count of the accumulated data exceeds "1024", which is the full flag threshold value (that is, when the logically full state is identified), the full flag of "H" level is output to DMA controller 43.

DMA controller 43 acquires the right to use the bus, upon receiving the "H" level signal, and performs DMA transfer of at least 4 sets of data to the memory (here, 256 data accumulated in the FIFO are assumed as one set of data) until it receives "H" level signal as the empty flag. Here, the term "at least" implies that, even during the DMA transfer processing of the data, the data is intermittently written from asynchronous data driven information processor 30 into the FIFO in parallel. For example, after the DMA transfer processing of 4 sets of 256 data, when the "H" level signal is input from the FIFO to DMA controller 43 as the empty flag, DMA controller 43 releases the right to use the bus, and terminates the DMA transfer processing.

As described above, in this application, the empty flag threshold value is set to "256" in order to perform DMA transfer by the unit of 256 data (1 set), while the full flag threshold value is set to "1024" in order to perform DMA transfer of at least 4 sets collectively. Thus, the number of times of acquiring/releasing the right to use the bus can be reduced, compared to the previous example in which the right to use the bus is acquired every time 256 data is subjected to DMA transfer. In addition, more efficient DMA transfer (burst transfer) requiring shorter time for acquiring/releasing the right to use the bus (overhead time) can be achieved.

FIG. 12 shows an example in which the self-synchronous FIFO memory device according to the present invention is used as a queue buffer aiming at data buffer within one processor nPE in the asynchronous data driven information processor. Processor nPE within the asynchronous data driven information processor has a configuration in which different functional blocks such as CST, FC, FP, and PS are connected in a ring shape. The data input in the ring is subjected to one processing during one round of the ring. As a result of successive input of the data, the ring will be packed with data (the full state), and all data transfer within the ring may be stopped. By utilizing the self-synchronous FIFO memory device used here, an acceptable count of the data transferred within the ring can be increased, and the suspension of the data processing can be avoided.

Figure 19:
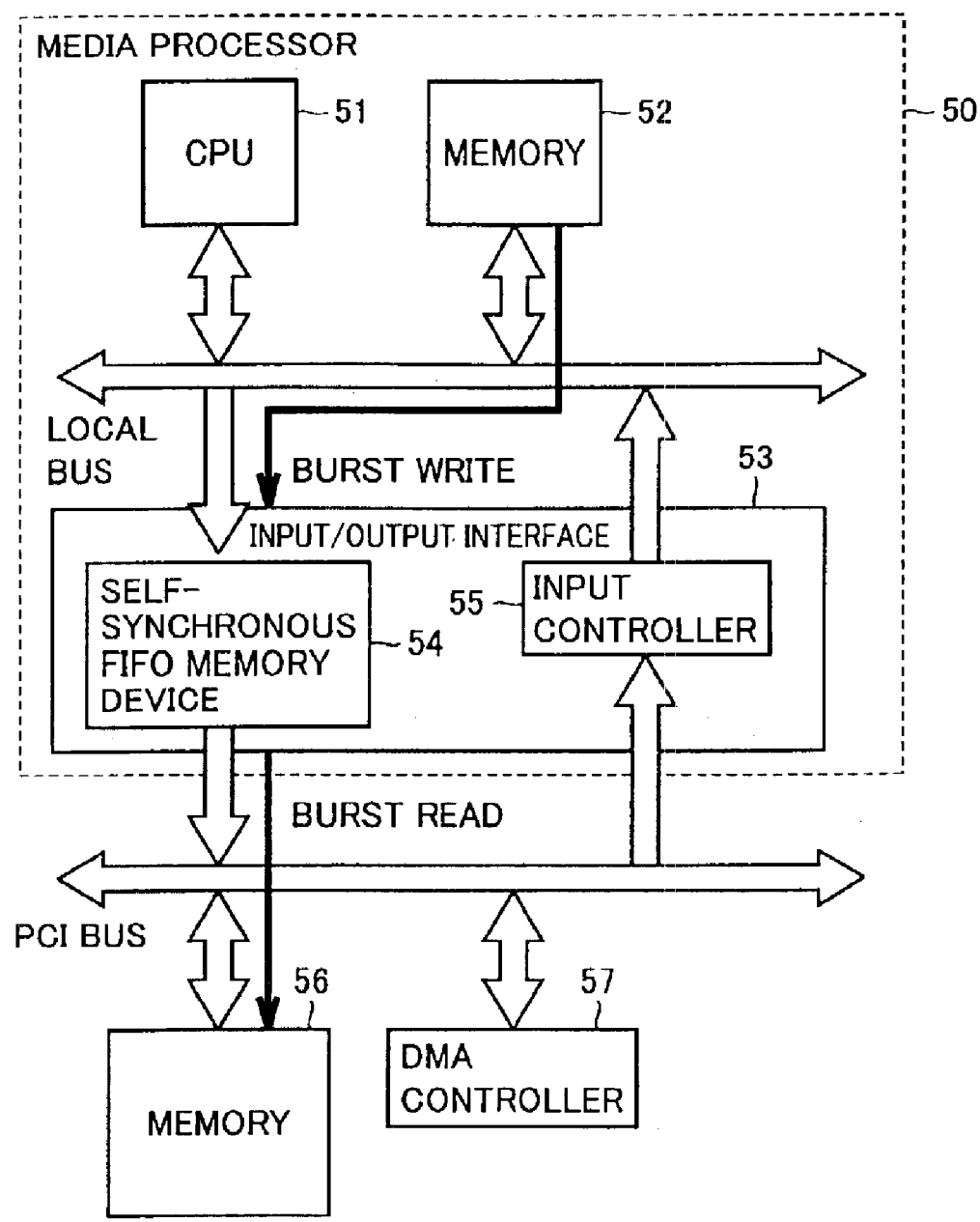
FIG. 19 shows another application of the self-synchronous FIFO memory device.
Figure 20:
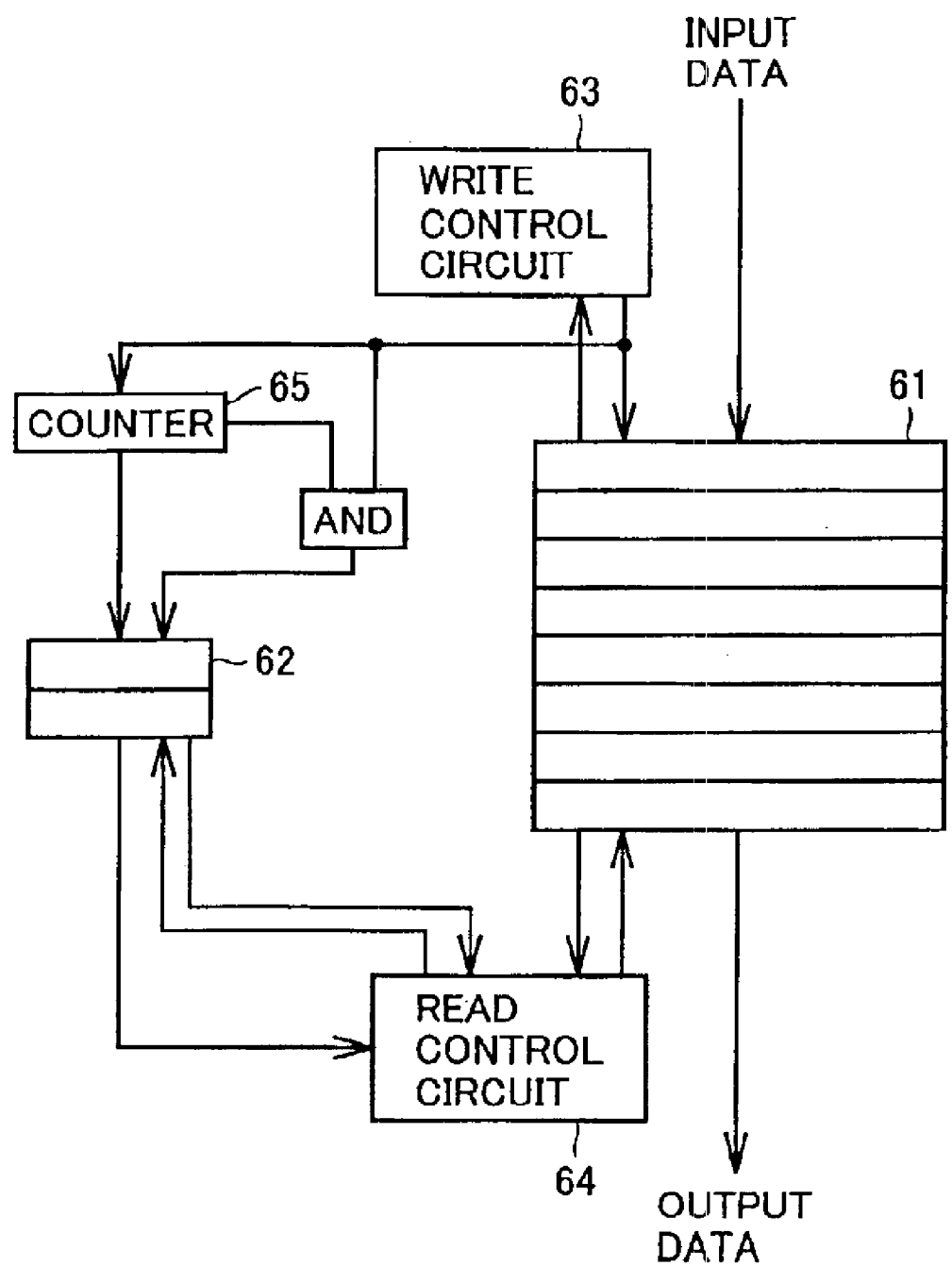
FIG. 20 is a block diagram of a conventional asynchronous FIFO buffer device.
Figure 21:
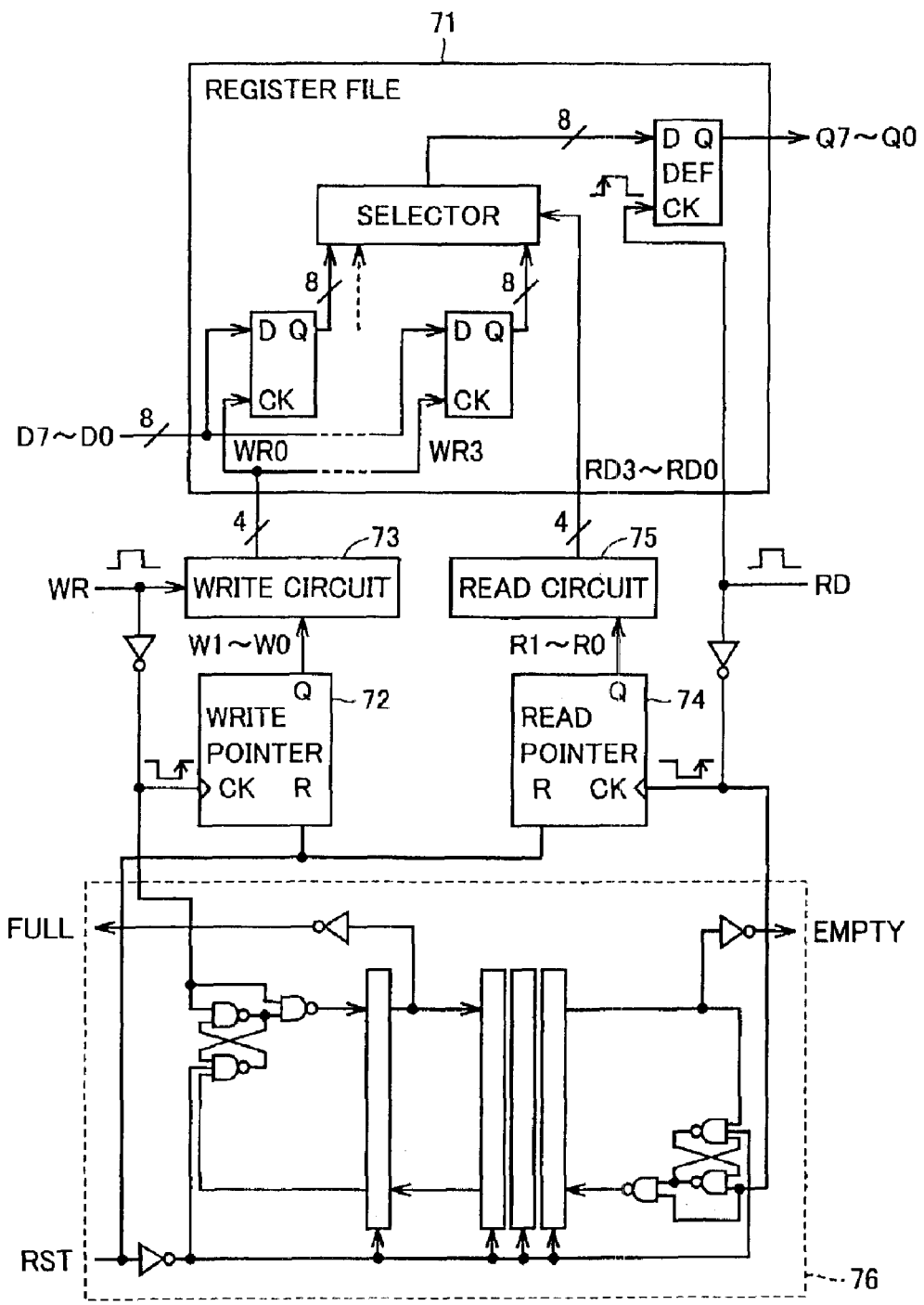
FIG. 21 shows a conventional asynchronous FIFO circuit.

As a next application, referring to FIG. 19 in conjunction with the conventional example, an example in which the self-synchronous FIFO memory device according to the present invention aiming at efficient data transfer is used to connect the media processor constituted with the CPU, a memory 1, an input/output interface, and a local bus (an internal bus) to an external PCI bus will be described.

A system example, in which the self-synchronous FIFO memory device according to the present invention is used as input/output interface 53 to perform burst write by a unit of 64 write data and burst read by a unit of 256 read data, will be described.

The full flag (FUL signal in FIG. 1) of the self-synchronous FIFO memory device (FIG. 1) is input to CPU 51, while the empty flag (EMP signal in FIG. 1) is input to DMA controller 57. Here, both flags are "L" active. When the FUL signal and the EMP signal both attain "L" level, burst write/burst read is carried out. The FIFO is provided with "1980" as the full flag threshold value (TH_FUL terminal in FIG. 1), and 260 as the empty flag threshold value (TH_EMP terminal in FIG. 1).

It is assumed that a large amount of data is processed in media processor 50, a large amount of data is stored in memory 52, and no data is stored in self-synchronous FIFO memory device 54, that is, the empty state is attained. Here, the data count in the FIFO attains "0", which is smaller than TH_FUL value of "1980" and TH_EMP value of "260". Therefore, the FUL signal of "L" level is output from the FIFO to the CPU, and the EMP signal of "H" level is output to DMA controller 57. Upon receiving the FUL signal of "L" level, CPU 51 starts burst write by the unit of 64 from memory 52 to the FIFO.

When the data count within the FIFO exceeds 260, the EMP signal output from the FIFO attains "L" level. When DMA controller 57 receives this signal, it starts burst read by the unit of 256 from the FIFO to memory 56. Here, since the FUL signal output from the FIFO attains "L" level, it continues burst read by the unit of 64. When the count of the data stored in the FIFO exceeds "1980", the FUL signal of "H" level and the EMP signal of "L" level are output from the FIFO, and burst write from memory 52 to the FIFO is stopped. Burst read from the FIFO to memory 56 continues.

As described above, the FIFO device according to the present invention can adapt to burst write and burst read by different data units. In addition, if the count of the data stored in the FIFO falls within a range between full flag threshold value and empty flag threshold value that have been set, burst write and burst read can simultaneously be performed.

In the embodiment described above, when the self-synchronous FIFO memory device attains the full state (write prohibition state), a time period is about 2.3 ns from the time point immediately after the input of the first read clock ("L" pulse signal) until the time point when the write prohibition state is reset, that is, from the rise of RCK until the rise of RO. This response time is 200 times or more shorter than in the self-synchronous FIFO circuit introduced in the conventional art (the circuit in which 2048 data transmission paths are connected in series). Here, a cycle of the write/read clock is set to 30 ns.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A self-synchronous FIFO memory device, being a first-in first-out memory device having at least one self-synchronous transfer control circuit, comprising:

an arbitration circuit adjusting timings of a write request signal from a first external device and a read request signal from a second external device;

a memory cell array unit performing data write/data read in accordance with said write request signal/read request signal, respectively; and a state control circuit having a function to calculate a write address/read address to be input to said memory cell array unit in accordance with said write request signal/ read request signal, and a function to count data stored in the self-synchronous FIFO memory device.

2. The self-synchronous FIFO memory device according to claim 1, wherein said self-synchronous transfer control circuit constitutes a data transmission path together with at least one of a register circuit and said memory cell array unit, and said data transmission path constitutes a pipeline via said self-synchronous transfer control circuit.

3. The self-synchronous FIFO memory device according to claim 2, wherein said state control circuit counts the data present within the self-synchronous FIFO memory device in accordance with one of said read request signal and write request signal, and outputs one of a data full signal and a data empty signal by comparison of the count of the data with one of a predetermined full state data count threshold value and empty state threshold value.

4. The self-synchronous FIFO memory device according to claim 2, wherein said data transmission path includes said memory cell array, a subsequent stage of said data transmission path is pipeline-connected with a data transmission path including at least one register circuit, and a pipeline is configured so as to transmit data toward the subsequent stage of said data transmission path, so long as data is present within the self-synchronous FIFO memory device.

5. The self-synchronous FIFO memory device according to claim 4, wherein said state control circuit counts the data present within the self-synchronous FIFO memory device in accordance with one of said read request signal and write request signal, and outputs one of a data full signal and a data empty signal by comparison of the count of the data with one of a predetermined full state data count threshold value and empty state threshold value.

6. The self-synchronous FIFO memory device according to claim 2, wherein said data transmission path includes said memory cell array, at least two data transmission paths including said register circuit via said arbitration circuit are provided in a preceding stage of the data transmission path, one of the data transmission paths has said write request signal input, and another of the data transmission paths has said read request signal input.

7. The self-synchronous FIFO memory device according to claim 6, wherein said state control circuit counts the data present within the self-synchronous FIFO memory device in accordance with one of said read request signal and write request signal, and outputs one of a data full signal and a data empty signal by comparison of the count of the data with one of a predetermined full state data count threshold value and empty state threshold value.

8. The self-synchronous FIFO memory device according to claim 6, wherein said data transmission path includes said memory cell array, a subsequent stage of said data transmission path is pipeline-connected with a data transmission path including at least one register circuit, and a pipeline is configured so as to transmit data toward the subsequent stage of said data transmission path, so long as data is present within the self-synchronous FIFO memory device.

9. The self-synchronous FIFO memory device according to claim 8, wherein said state control circuit counts the data present within the self-synchronous FIFO memory device in accordance with one of said read request signal and write request signal, and outputs one of a data full signal and a data empty signal by comparison of the count of the data with one of a predetermined full state data count threshold value and empty state threshold value.

10. The self-synchronous FIFO memory device according to claim 1, wherein said data transmission path includes said memory cell array, at least two data transmission paths including said register circuit via said arbitration circuit are provided in a preceding stage of the data transmission path, one of the data transmission paths has said write request signal input, and another of the data transmission paths has said read request signal input.

11. The self-synchronous FIFO memory device according to claim 10, wherein said state control circuit counts the data present within the self-synchronous FIFO memory device in accordance with one of said read request signal and write request signal, and outputs one of a data full signal and a data empty signal by comparison of the count of the data with one of a predetermined full state data count threshold value and empty state threshold value.

12. The self-synchronous FIFO memory device according to claim 10, wherein said data transmission path includes said memory cell array, a subsequent stage of said data transmission path is pipeline-connected with a data transmission path including at least one register circuit, and a pipeline is configured so as to transmit data toward the subsequent stage of said data transmission path, so long as data is present within the self-synchronous FIFO memory device.

13. The self-synchronous FIFO memory device according to claim 12, wherein said state control circuit counts the data present within the self-synchronous FIFO memory device in accordance with one of said read request signal and write request signal, and outputs one of a data full signal and a data empty signal by comparison of the count of the data with one of a predetermined full state data count threshold value and empty state threshold value.

14. The self-synchronous FIFO memory device according to claim 1, wherein said data transmission path includes said memory cell array, a subsequent stage of said data transmission path is pipeline-connected with a data transmission path including at least one register circuit, and a pipeline is configured so as to transmit data toward the subsequent stage of said data transmission path, so long as data is present within the self-synchronous FIFO memory device.

15. The self-synchronous FIFO memory device according to claim 14, wherein said state control circuit counts the data present within the self-synchronous FIFO memory device in accordance with one of said read request signal and write request signal, and outputs one of a data full signal and a data empty signal by comparison of the count of the data with one of a predetermined full state data count threshold value and empty state threshold value.

16. The self-synchronous FIFO memory device according to claim 1, wherein said state control circuit counts the data present within the self-synchronous FIFO memory device in accordance with one of said read request signal and write request signal, and outputs one of a data full signal and a data empty signal by comparison of the count of the data with one of a predetermined full state data count threshold value and empty state threshold value.

17. The self-synchronous FIFO memory device according to claim 1, used as a queue buffer between pipelines constituting a processor circuit.

18. A system with an interface for data transfer, having a self-synchronous FIFO memory device inserted in a data path between first and second external devices each operating with a different timing signal; wherein said self-synchronous FIFO memory device is a first-in first-out memory device having at least one self-synchronous transfer control circuit, said self-synchronous FIFO memory device includes an arbitration circuit adjusting timings of a write request signal from a first external device and a read request signal from a second external device, a memory cell array unit performing data write/data read in accordance with said write request signal/read request signal, respectively, and a state control circuit having a function to calculate a write address/read address to be input to said memory cell array unit in accordance with said write request signal/read request signal, and a function to count data stored in the self-synchronous FIFO memory device;

said first external device successively outputs said write request signal to said self-synchronous FIFO memory device, so long as a data full signal is inactive; and said second external device successively outputs said read request signal to said self-synchronous FIFO memory device, so long as a data empty signal is inactive.

* * * * *